US010581140B2

(12) United States Patent
Lee et al.

(10) Patent No.: US 10,581,140 B2
(45) Date of Patent: Mar. 3, 2020

(54) ANTENNA MODULE HAVING METAL FRAME ANTENNA SEGMENT AND ELECTRONIC DEVICE INCLUDING THE SAME

(71) Applicant: Samsung Electronics Co., Ltd., Suwon-si, Gyeonggi-do (KR)

(72) Inventors: Young-Ki Lee, Incheon (KR); Jae-suk Lee, Suwon-si (KR); Il-Jong Song, Suwon-si (KR); Yo-Han Jang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 287 days.

(21) Appl. No.: 15/392,217

(22) Filed: Dec. 28, 2016

(65) Prior Publication Data

US 2017/0324147 A1    Nov. 9, 2017

(30) Foreign Application Priority Data

May 3, 2016    (KR) .................. 10-2016-0054691

(51) Int. Cl.
*H01Q 1/24* (2006.01)
*H01Q 1/22* (2006.01)
*H04B 5/00* (2006.01)
*H01Q 21/30* (2006.01)
*H01Q 21/28* (2006.01)
*H01Q 7/00* (2006.01)
*H01Q 1/38* (2006.01)
*H01Q 1/27* (2006.01)
(Continued)

(52) U.S. Cl.
CPC .......... *H01Q 1/2291* (2013.01); *H01Q 1/243* (2013.01); *H01Q 1/273* (2013.01); *H01Q 1/362* (2013.01); *H01Q 1/38* (2013.01); *H01Q 7/00* (2013.01); *H01Q 7/06* (2013.01); *H01Q 21/28* (2013.01); *H01Q 21/30* (2013.01); *H04B 5/0031* (2013.01)

(58) Field of Classification Search
CPC . H01Q 1/243; H01Q 7/06; H02J 7/025; H02J 50/00; H02J 50/10; H02J 50/12
USPC ........................................ 343/702, 872, 878
See application file for complete search history.

(56) References Cited

U.S. PATENT DOCUMENTS 7,688,270 B2    3/2010    Tsushima
8,188,933 B2    5/2012    Nakamura et al.
(Continued)

FOREIGN PATENT DOCUMENTS

CN    104993215 A    10/2015

OTHER PUBLICATIONS

European Search Report dated Sep. 20, 2017 received in corresponding European Application No. 17168992.0.
(Continued)

*Primary Examiner* — Dameon E Levi
*Assistant Examiner* — Collin Dawkins
(74) *Attorney, Agent, or Firm* — Harness, Dickey & Pierce, P.L.C.

(57) ABSTRACT

An antenna module including a first antenna configured to transmit and receive a plurality of signals, the first antenna including a first frame antenna segment including at least a part of a metal frame, the metal frame surrounding a body housing of an electronic device, and a first coil antenna segment connected to the first frame antenna segment, the first coil antenna segment including a first conductive coil may be provided.

18 Claims, 23 Drawing Sheets

(51) Int. Cl.
*H01Q 1/36* (2006.01)
*H01Q 7/06* (2006.01)

(56) References Cited

U.S. PATENT DOCUMENTS

| | | | |
|---|---|---|---|
| 8,648,752 B2 | 2/2014 | Ramachandran et al. | |
| 8,810,194 B2 | 8/2014 | Kirby et al. | |
| 8,811,894 B2 | 8/2014 | Cordier | |
| 8,814,046 B1 | 8/2014 | Wallner | |
| 8,905,317 B1 | 12/2014 | Hsu et al. | |
| 2008/0238799 A1 | 10/2008 | Tsushima | |
| 2012/0206303 A1* | 8/2012 | Desclos | H01Q 1/243 343/702 |
| 2014/0111389 A1* | 4/2014 | Jung | H01Q 1/2208 343/702 |
| 2014/0247188 A1 | 9/2014 | Nakano et al. | |
| 2015/0116168 A1 | 1/2015 | Yosui | |
| 2015/0249485 A1* | 9/2015 | Ouyang | H04B 5/0081 455/41.1 |
| 2016/0006108 A1 | 1/2016 | Kato | |
| 2016/0112219 A1 | 4/2016 | Lee et al. | |
| 2016/0351991 A1 | 12/2016 | Chen et al. | |
| 2018/0083493 A1* | 3/2018 | Hwang | H01Q 1/24 |
| 2018/0138746 A1* | 5/2018 | Jang | H01Q 1/38 |

OTHER PUBLICATIONS

Chinese Office Action dated Dec. 25, 2019 issued in corresponding Chinese Patent Application No. 201710303530.7.

* cited by examiner

ANTENNA MODULE HAVING METAL FRAME ANTENNA SEGMENT AND ELECTRONIC DEVICE INCLUDING THE SAME

CROSS-REFERENCE TO RELATED APPLICATION

This application claims the benefit of Korean Patent Application No. 10-2016-0054691, filed on May 3, 2016, in the Korean Intellectual Property Office, the disclosure of which is incorporated herein in its entirety by reference.

BACKGROUND

The inventive concepts relate to antenna modules, and more particularly, to antenna modules having a metal frame antenna segment and/or electronic devices including the same.

A mobile electronic device (e.g., a smart phone, a tablet personal computer (PC), and a smart watch) may include wireless modules for a plurality of respective operations including wireless communication with an external device. As electronic devices become lighter and smaller, a sufficient region of antenna modules for a plurality of operations including wireless communication may not be ensured, and thus degradation of performance of wireless communication operations may occur.

SUMMARY

The inventive concepts provide antenna modules, and more particularly, antenna modules having a metal frame antenna segment and/or electronic devices including the same.

According to an example embodiment, an antenna module may include a first antenna configured to transmit and receive a plurality of signals, the first antenna including a first frame antenna segment including at least a part of a metal frame surrounding a body housing of an electronic device, and a first coil antenna segment connected to the first frame antenna segment and including a first conductive coil.

According to an example embodiment, an electronic device may include an antenna module including at least one antenna to transmit and receive a plurality of signals to and from an external device, and at least one wireless module connected to the antenna, the antenna including a first frame antenna segment including at least a part of a metal frame surrounding a body housing of the electronic device, and a first coil antenna segment connected to the first frame antenna segment and including a first conductive coil.

According to an example embodiment, an electronic device may include a body housing, a frame surrounding at least a portion of the body housing, the frame being a metal frame or an insulator frame, an antenna module configured to transmit and receive signals to and from an external device, the antenna module including at least one frame antenna segment and at least one coil antenna segment, the at least one frame antenna segment including a partial region of the metal frame when the frame is the metal frame, or a metal pattern helically coated around the insulator frame when the frame is the insulator frame, the at least one coil antenna segment connected to the at least one frame antenna segment, the at least one coil antenna segment including a helically wound conductive coil, and a wireless module connected to the antenna module.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
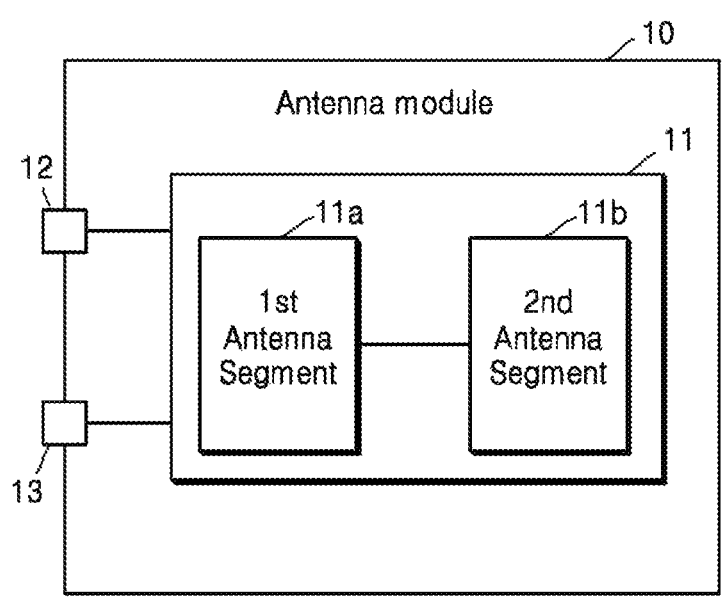
FIG. 1 is a block diagram of an antenna module according to an example embodiment of the inventive concepts.

FIG. 1 is a block diagram of an antenna module 10 according to an example embodiment of the inventive concepts.

Referring to FIG. 1, the antenna module 10 may include at least one antenna 11, according to an example embodiment of the inventive concepts. According to an example embodiment, the antenna 11 may be connected to wireless modules performing desired (or alternatively prescribed) wireless communication operations through a plurality of terminals 12 and 13. According to an example embodiment, the antenna 11 may include a first antenna segment 11a and a second antenna segment 11b. The first antenna segment 11a may be formed of at least one of copper (Cu), aluminum (Al), iron (Fe), titanium (Ti), silver (Ag), palladium (Pd), platinum (Pt), gold (Au), and nickel (Ni), or an alloy of at least two of them. However, this is only an example and is not limited thereto. The first antenna segment 11a may be formed of other metals or an alloy of other metals. Furthermore, the first antenna segment 11a may be formed by coating a metal pattern of a helical shape or an arbitrary shape having inductance on an inner surface of an insulator (e.g., plastic).

The second antenna segment 11b may include a conductive coil. According to an example embodiment, the second antenna segment 11b may be formed by winding one or more turns a conductive line or a conductive pattern formed of a conductive material on a magnetic substance having a desired (or alternatively prescribed) shape. The conductive line or the conductive pattern may form the conductive coil. Hereinafter, the winding of the conductive line or the conductive pattern on the magnetic substance by a desired (or alternatively prescribed) number of turns may be referred to as the number of windings of the conductive coil. The magnetic substance may be a magnetic substance substrate, or may be a ferrite sheet including nickel-zinc-copper (NiZnCu), manganese-zinc (MnZn), an M-type ferrite, a Y-type ferrite, a W-type ferrite, or a Z-type ferrite. Furthermore, the magnetic substance may be a columnar magnetic substance, but this is only an example and inventive concepts are not limited thereto. Various shapes of magnetic substances, around which a conductive line or a conductive pattern is wound one or more turns, may be formed. Furthermore, the second antenna segment 11b may be a loop antenna forming an antenna pattern directly on a flexible printed circuit board (PCB), in which the conductive coil may be the antenna pattern.

According to the present disclosure, the antenna 11 may be connected to wireless modules and have inductance having a value that is substantially the same as a total value of inductance of the first antenna segment 11a and the inductance of the second antenna segment 11b. In some example embodiment, the first and second antenna segments 11a and 11b may be connected to each other in series. Although FIG. 1 illustrate the antenna 11 including one first antenna segment 11a and one second antenna segment 11b, inventive concepts are not limited thereto. Each of the first and second antenna segments 11a and 11b may be plural. Furthermore, the antenna module 10 may include a desired (or alternatively prescribed) multiplexer including a plurality of switching devices, and may form an antenna by respectively and selectively connecting the first and second antenna segments 11a and 11b through the multiplexer. A detailed description thereof will be provided later below.

Figure 2:
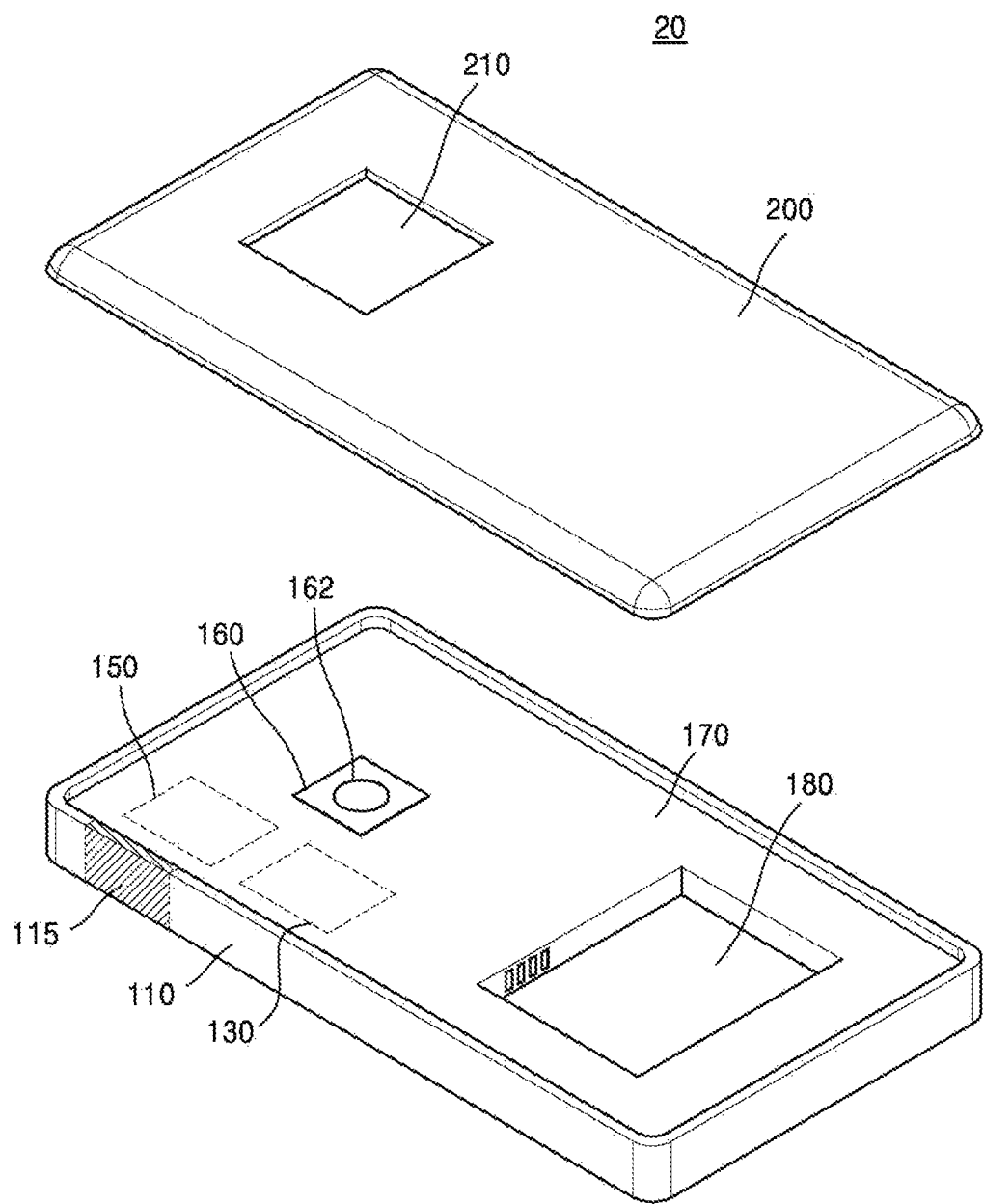
FIG. 2 is a configuration diagram of an electronic device including the antenna module of FIG. 1, according to an example embodiment of the inventive concepts.

FIG. 2 is a configuration diagram of an electronic device 20 including the antenna module 10 of FIG. 1, according to an example embodiment of the inventive concepts.

Referring to FIG. 2, the electronic device 20 may include a body housing 170, a metal frame 110 surrounding sides of the body housing 170, and a rear cover 200. The electronic device 20 may be any mobile device such as a smart phone, a cellular phone, a tablet personal computer (PC), a laptop computer, a personal digital assistant (PDA), a portable multimedia player (PMP), a digital camera, a music player, a portable game console, or a navigation device. Furthermore, the electronic device 20 may be any wearable device such as a smart watch, a smart belt, or a smart band.

The body housing 170 may form an entire frame of the electronic device 20, and may be formed of an insulating material (e.g., plastic). The body housing 170 may include a PCB on which various electronic circuit chips or electric elements are mounted, and may further include a camera module 160 including a camera lens 162. Furthermore, the body housing 170 may include a battery container 180 containing a battery. A display screen or an input key button may be arranged in front of the body housing 170.

A first antenna segment 115 may include at least a partial region of the metal frame 110, and may function as an antenna by using the partial region of the metal frame 110. Hereinafter, the first antenna segment 115 may be referred to as a first frame antenna segment, and a second antenna segment 130 may be referred to as a second coil antenna segment. Although FIG. 2 illustrates that the first frame antenna segment 115 includes the partial region of the metal frame 110, the whole metal frame 110 may correspond to the first frame antenna segment 115 functioning as an antenna. In another example embodiment, when the electronic device 20 includes an insulator frame (e.g., a plastic frame) instead of the metal frame 110, the first frame antenna segment 115 may be formed by coating a metal pattern of a helical shape or an arbitrary shape having inductance on an inner surface of a partial region of the insulator frame.

A PCB in the body housing 170 may include the second coil antenna segment 130 connected to the first frame antenna segment 115, and a wireless module 150 connected to an antenna including the first frame antenna segment 115 and the second coil antenna segment 130. The antenna including the first frame antenna segment 115 and the second coil antenna segment 130 may transmit and receive desired (or alternatively prescribed) signals to and from an external device so the wireless module 150 may perform desired (or alternatively prescribed) wireless communication operations. The desired (or alternatively prescribed) signals may vary depending on a type of the wireless module 150.

The wireless module 150 may be a near field communication (NFC) module including a circuit and/or a chip by which NFC is performed, a magnetic secure transmission (MST) module including a circuit and/or a chip by which MST is performed, or a wireless charging module including a circuit and/or a chip by which power is transmitted and received to and from an external device wirelessly. Although FIG. 2 illustrates that the wireless module 150 is mounted on the PCB, but the inventive concepts are not limited thereto. Two or more wireless modules may be mounted on the PCB and types of the wireless modules may be the same or different from each other.

The rear cover 200 may be arranged to cover a rear surface of the body housing 170 of the electronic device 20. The rear cover 200 may include an opening 210. When the rear cover 200 is attached to the body housing 170, the camera module 160 may be exposed to the outside through the opening 210. For example, the camera lens 162 may be exposed to the outside through the opening 210. The rear cover 200 may include a metal or an insulator (e.g., plastic), and according to an example embodiment. The rear cover 200 may be formed integrally with the electronic device 20.

Because the first frame antenna segment 115 is provided at an outside of the electronic device 20 and includes a metal, its performance of radiating a signal to another electronic device or performance of receiving a signal from another electronic device may be better than that of an antenna segment including a general conductive coil and provided in an electronic device. Furthermore, the second coil antenna segment 130, which reinforces inductance of an antenna by being connected to the first frame antenna segment 115 in series, may ensure inductance required for the wireless module 150 to perform wireless communication operations.

Figure 3A:
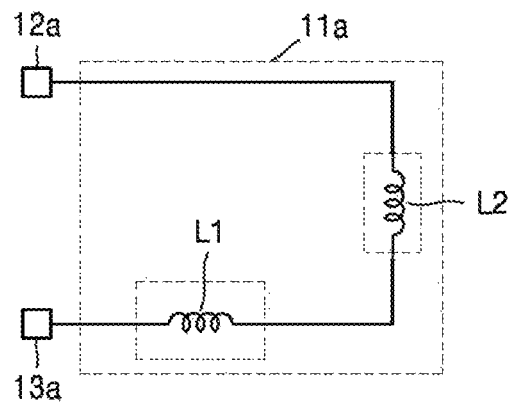
FIGS. 3A and 3B are equivalent circuits of the antenna of FIG. 1, according to some example embodiments.
Figure 3B:
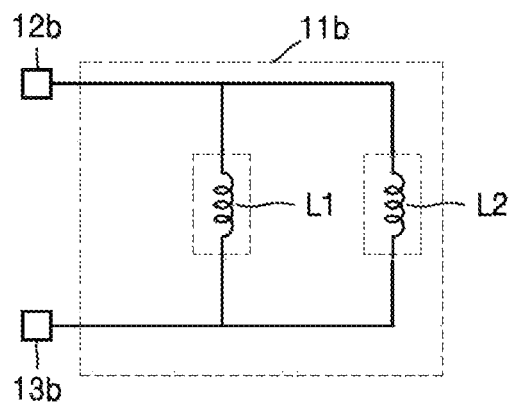
Figure 3C:
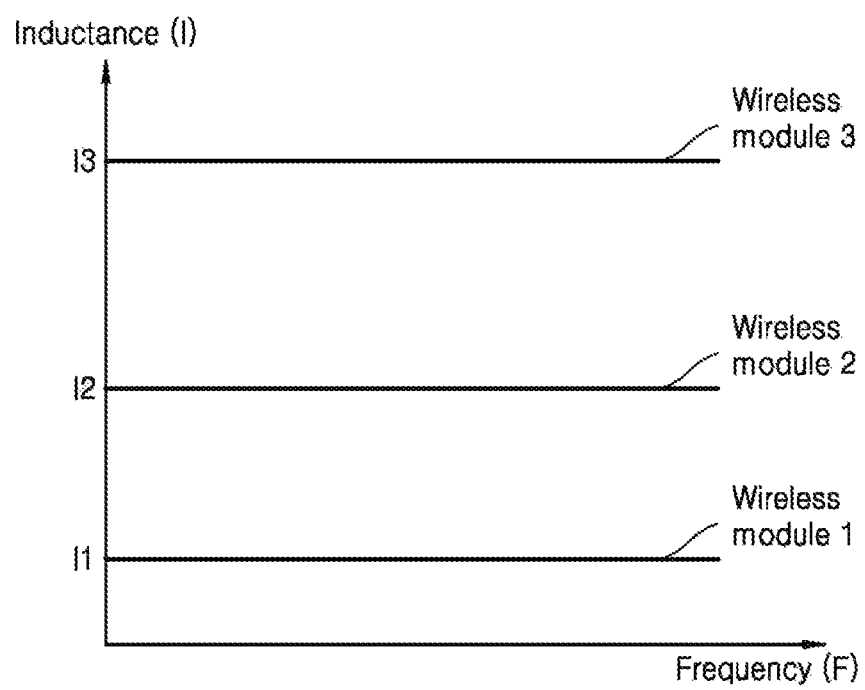
FIG. 3C illustrates inductances required according to a type of a wireless module.

FIGS. 3A and 3B are equivalent circuits of the antenna module 11 of FIG. 1, according to some example embodiments, and FIG. 3C illustrates inductances required according to a type of a wireless module.

Referring to FIGS. 1, 3A, and 3B, the antenna 11 may include a first antenna segment, which includes a first inductor L1 having first inductance and a second antenna segment, which includes a second inductor L2 having second inductance. Hereinafter, the first antenna segment 11a may be referred to as a first frame antenna segment, and the second antenna segment 11b may be referred to as a second coil antenna segment. The antenna 11 may include a configuration having a total inductance of the inductance of the first inductor L1 and the inductance of the second inductor L2. For example, the antenna 11 may include a configuration in which the first frame antenna segment 11a (e.g., first inductor L1) and the second coil antenna segment 11b (e.g., second inductor L2) are connected to each other in series.

According to some example embodiments, the first inductor L1 included in the first frame antenna segment 11a may be serially connected to the second inductor L2 included in the first frame antenna segment 11a. Furthermore, in an example embodiment, the second inductor L2 may be electrically connected to a first terminal 12 and the first inductor L1 may be electrically connected to a second terminal 13. The antenna 11 may be electrically connected to a wireless module included in an electronic device through the first and second terminals 12 and 13.

In an example embodiment, at least one of the inductance of the first inductor L1 and the inductance of the second inductor L2 may be changed. For example, a length of a metal frame region included in the first frame antenna segment 11a may be longer or shorter to change the inductance of the first inductor L1. Furthermore, the number of windings and winding intervals of a conductive coil included in the second coil antenna segment 11b may vary to change the inductance of the second inductor L2. For example, when a first wireless module has greater inductance for wireless communication operations than that of a second wireless module, the number of windings of the conductive coil of the second coil antenna segment 11b (e.g., second inductor L2) connected to the first wireless module may be greater than that of the second coil antenna segment 11b (e.g., second inductor L2) connected to the second wireless module.

Accordingly, the antenna 11 including the first frame antenna segment 11a and the second coil antenna segment 11b may provide inductance suitable for a wireless module to perform wireless communication operations.

Furthermore, in an example embodiment, the first and second terminals 12 and 13 may be connected to the wireless module performing wireless communication operations. For example, when the wireless module may be an NFC module, and the first and second terminals 12 and 13 may be connected to matching circuits having various circuit configurations and included in the wireless module.

Referring to FIGS. 1 and 3B, the first frame antenna segment 11a and the second coil antenna segment 11b may be connected to each other in parallel, unlike FIG. 3A. For example, the first inductor L1 corresponding to the first frame antenna segment 11a may be connected to the second inductor L2 corresponding to the second coil antenna segment 11b in parallel. In FIG. 3B, like reference numerals in FIG. 3A denote like elements, and repeated descriptions thereof are omitted for simplicity. Furthermore, the example embodiments described herein below describes assuming that the first frame antenna segment 11a and the second coil antenna segment 11b are connected to each other in series, however example embodiments are not limited thereto. The example embodiment described herein below may also be applied to a case where the first frame antenna segment 11a and the second coil antenna segment 11b are connected to each other in parallel.

Referring to FIG. 3C, in a desired (or alternatively prescribed) frequency section F, the inductance of an antenna suitable for an operation of a first wireless module (wireless module 1) may be a first inductance I1, the inductance of an antenna suitable for an operation of a second wireless module (wireless module 2) may be a second inductance I2, and the inductance of an antenna suitable for an operation of a third wireless module (wireless module 3) may be a third inductance I3. For example, the first wireless module (wireless module 1) may be an NFC module, the second wireless module (wireless module 2) may be a wireless charging module, and the third wireless module (wireless module 3) may be an MST module. However, this is only an example and the inductance of an antenna required according to a type of each wireless module may vary. Furthermore, an antenna of the present disclosure may provide inductance suitable for performing an operation of each wireless module.

Figure 4A:
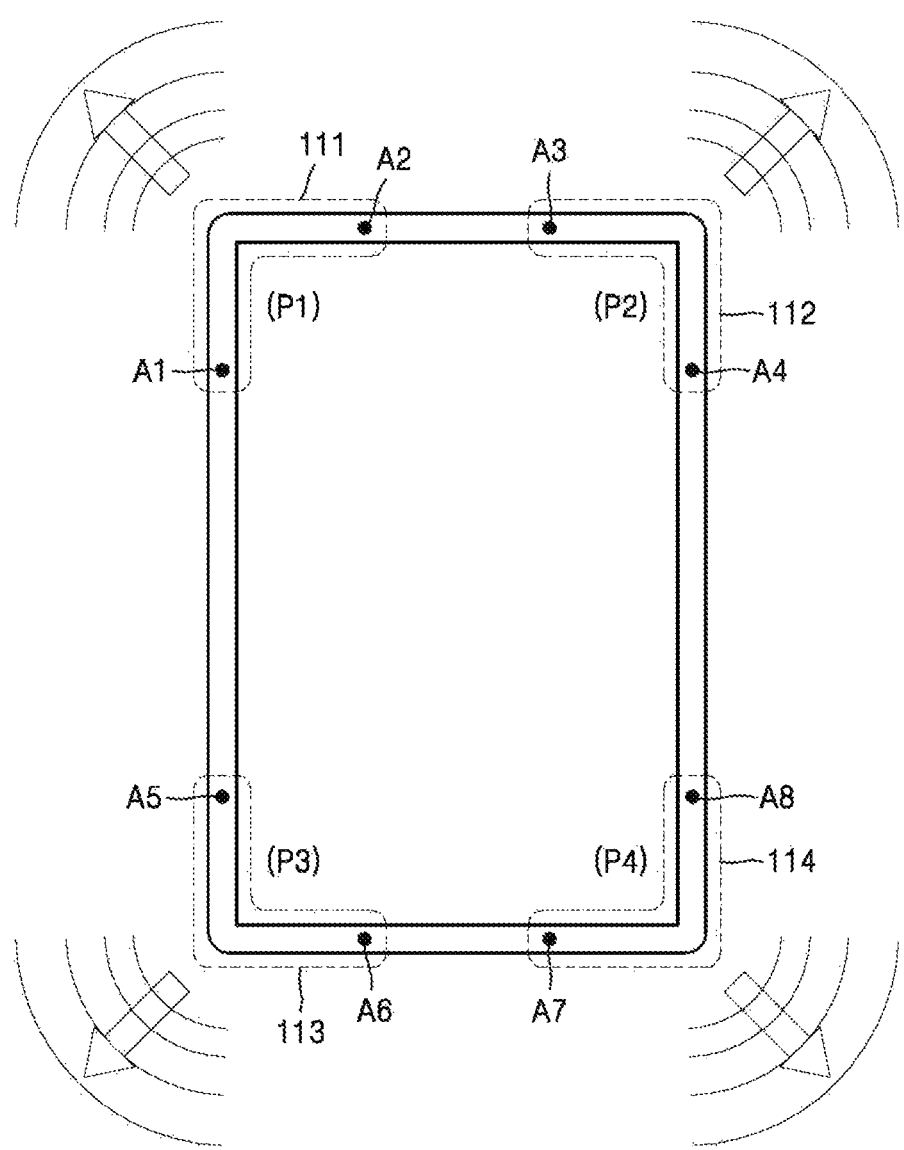
FIGS. 4A and 4B are views of frame antenna segments capable of being realized according to some example embodiments of the inventive concepts.
Figure 4B:
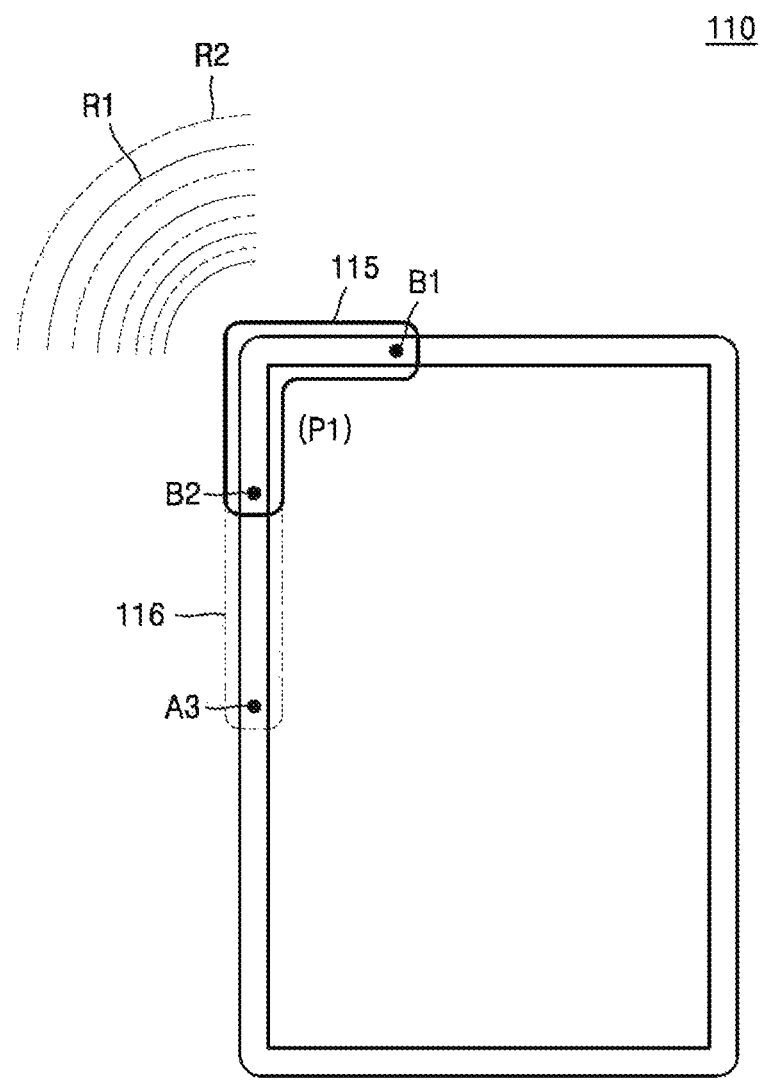

FIGS. 4A and 4B are views of frame antenna segments capable of being realized according to some example embodiments of the inventive concepts.

Referring to FIGS. 1 and 4A, the antenna module 10 of FIG. 1 may include at least one of first to fourth frame antenna segments 111 to 114.

The first frame antenna segment 111 may include a partial region and terminals A1 and A2 of a first position P1 of the metal frame 110. For example, the terminal A1 of the first frame antenna segment 111 may be electrically connected to a coil antenna segment, and the terminal A2 of the first frame antenna segment 111 may be electrically connected to a wireless module. An antenna including the first frame antenna segment 111 may radiate or receive a desired (or alternatively prescribed) signal around the first position P1.

In another example embodiment, the second frame antenna segment 112 may include a partial region and terminals A3 and A4 of a second position P2 of the metal frame 110. For example, the terminal A3 of the second frame antenna segment 112 may be electrically connected to a coil antenna segment, and the terminal A4 of the second frame antenna segment 112 may be electrically connected to a wireless module. An antenna including the second frame antenna segment 112 may radiate or receive a desired (or alternatively prescribed) signal around the second position P2.

In still another example embodiment, the third frame antenna segment 113 may include a partial region and terminals A5 and A6 of a third position P3 of the metal frame 110. For example, the terminal A5 of the third frame antenna segment 113 may be electrically connected to a coil antenna segment, and the terminal A6 of the third frame antenna segment 113 may be electrically connected to a wireless module. An antenna including the third frame antenna segment 113 may radiate or receive a desired (or alternatively prescribed) signal around the third position P3.

In yet another example embodiment, the fourth frame antenna segment 114 may include a partial region and terminals A7 and A8 of a fourth position P4 of the metal frame 110. For example, the terminal A7 of the fourth frame antenna segment 114 may be electrically connected to a coil antenna segment, and the terminal A8 of the fourth frame antenna segment 114 may be electrically connected to a wireless module. An antenna including the fourth frame antenna segment 114 may radiate or receive a desired (or alternatively prescribed) signal around the fourth position P4.

As such, a frame antenna segment may be realized based on a position on the metal frame 110 with respect to which a desired (or alternatively prescribed) signal is desired to be radiated or received. For example, when a wireless module electrically connected to the antenna 11 of FIG. 1 is set to radiate or receive a desired (or alternatively prescribed) signal around the first position P1 to perform wireless communication operations, the antenna 11 may include the first frame antenna segment 111.

Although FIG. 4A illustrates that each of the first to fourth frame antenna segments 111 to 114 includes only a partial region of the metal frame 110, but the inventive concepts are not limited thereto and the antenna module 10 of FIG. 1 may further include frame antenna segments including regions at various positions.

Referring to FIG. 4B, the first frame antenna segment 115 may include a first region of the metal frame 110 and terminals B1 and B2 of a first position P1 of the metal frame 110, and a second frame antenna segment 116 may include a second region of the metal frame 110 and terminal A3. A length of the second region may be longer than that of the first region, and the radiation performance of a signal R2 radiated by the second frame antenna segment 116 may be better than that of a signal R1 radiated by the first frame antenna segment 115.

In another example embodiment, a frame antenna segment may be realized based on a peripheral communication environment in which the antenna 11 radiates or receives a desired (or alternatively prescribed) signal. For example, when a wireless module electrically connected to the antenna 11 of FIG. 1 performs wireless communication operations in an area having a poor communication environment or needs higher radiation performance or reception performance to perform wireless communication operations, the antenna 11 may include the second frame antenna segment 116.

Figure 5A:
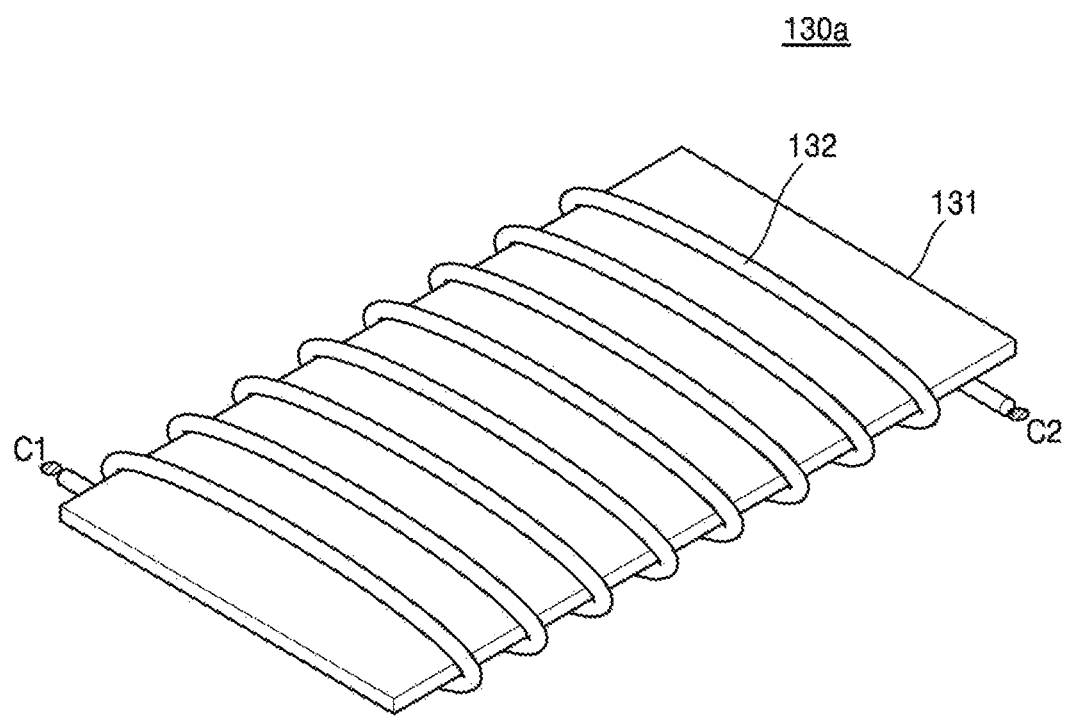
FIGS. 5A and 5B are views of coil antenna frames according to some example embodiments of the inventive concepts.
Figure 5B:
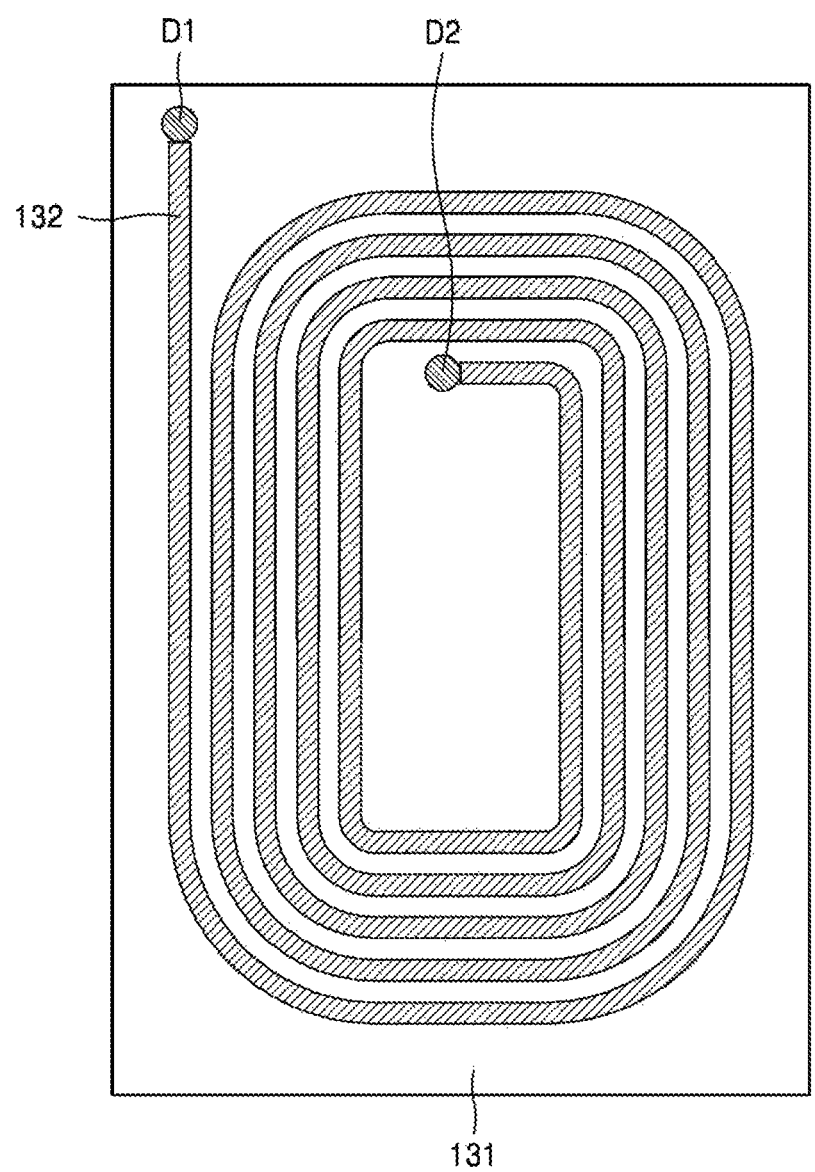

FIGS. 5A and 5B are views of coil antenna frames 130a and 130b according to some example embodiments of the inventive concepts.

Referring to FIG. 5A, the coil antenna frame 130a may include a conductive coil 132, and a plurality of terminals C1 and C2. The conductive coil 132 may include a magnetic sheet 131 around which a conductive line formed of a conductive material is helically wound one or more turns. In an example embodiment, the magnetic sheet 131 may be a ferrite sheet including NiZnCu, MnZn, an M-type ferrite, a Y-type ferrite, a W-type ferrite, or a Z-type ferrite. In another example embodiment, the magnetic sheet 131 may be formed of a mixture of soft magnetic powder and an organic binder, and the mixture may have a sheet shape. Furthermore, a surface of the magnetic sheet 131 may be covered with an insulator. The magnetic sheet 131 may be formed of a magnetic material having high magnetic permeability in a high frequency range, and the magnetic material may be formed of at least one of an iron-aluminum silicon alloy (sendust), an iron-nickel alloy (permalloy), an iron-nickel permalloy alloy (molybdenum permalloy), an iron-cobalt alloy, an iron-cobalt silicon alloy, an iron-silicon vanadium alloy, an iron-cobalt boron alloy, a cobalt-based amorphous alloy, an iron-based amorphous alloy, carbonyl iron, or pure iron. Furthermore, a shape of the magnetic sheet 131 may vary and may be, for example, a cylinder shape.

In an example embodiment, one of the terminals C1 and C2 may be electrically connected to a frame antenna segment and the other may be electrically connected to a wireless module. Inductance of the coil antenna frame 130a may be determined according to the number of windings and/or winding intervals of the conductive coil 132.

Referring to FIG. 5B, the coil antenna frame 130b may include the conductive coil 132, and a plurality of terminals D1 and D2. The conductive coil 132 may include the magnetic sheet 131 around which a conductive pattern formed of a conductive material is helically wound one or more turns. In an example embodiment, the magnetic sheet 131 may be a ferrite sheet including NiZnCu, MnZn, an M-type ferrite, a Y-type ferrite, a W-type ferrite, or a Z-type ferrite. In another example embodiment, the magnetic sheet 131 may include metal powder and a resin. In an example embodiment, one of the terminals D1 and D2 may be electrically connected to a frame antenna segment and the other may be electrically connected to a wireless module. Inductance of the coil antenna frame 130a may be determined according to the number of windings and/or winding intervals of the conductive coil 132. However, the coil antenna frames 130a and 130b of FIGS. 5A and 5B are provided to illustrate some example embodiments, and the inventive concepts are not limited thereto. The coil antenna frames 130a and 130b may include conductive coils having various configurations.

Figure 6A:
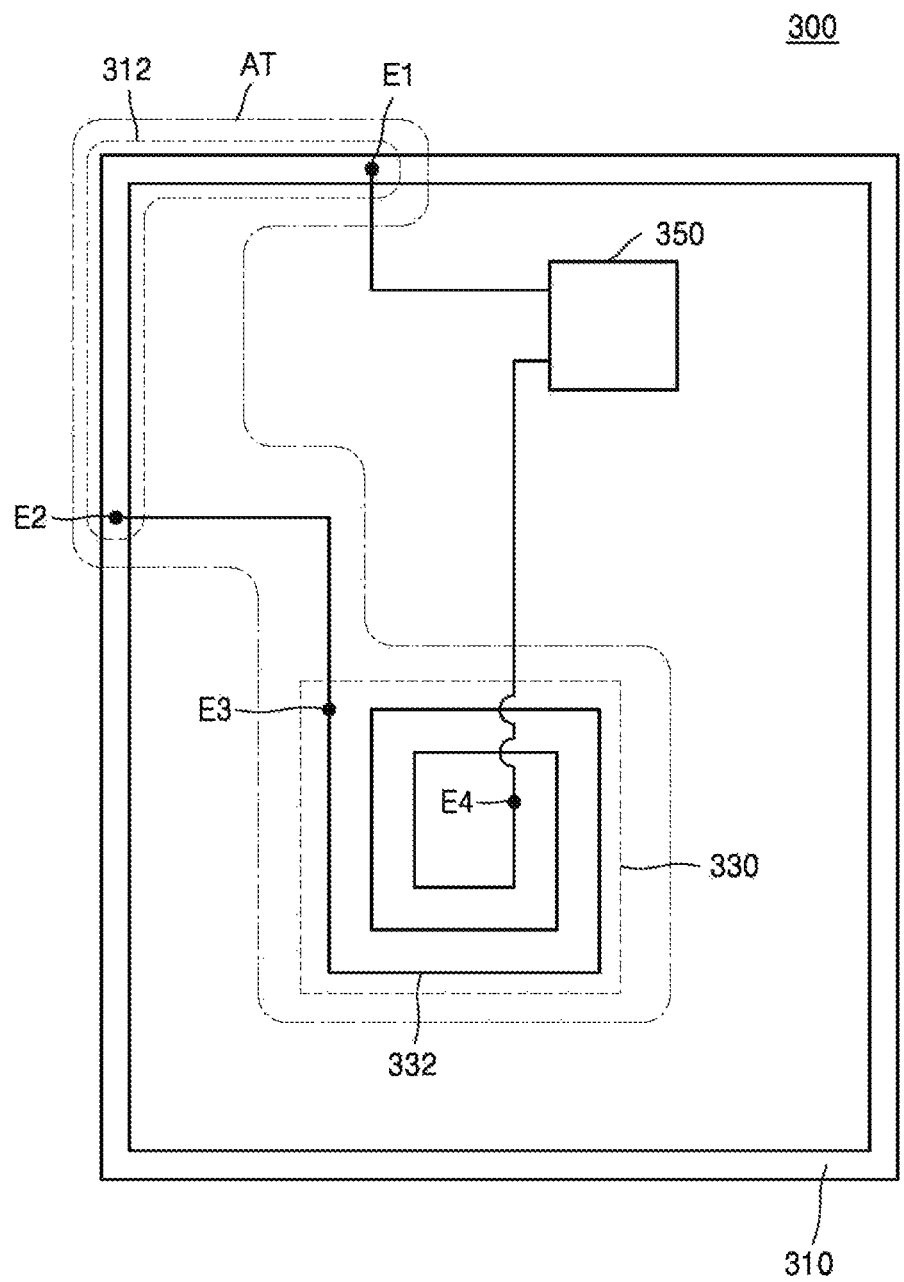
FIG. 6A is a configuration diagram of an electronic device according to some example embodiments of the inventive concepts.
Figure 6B:
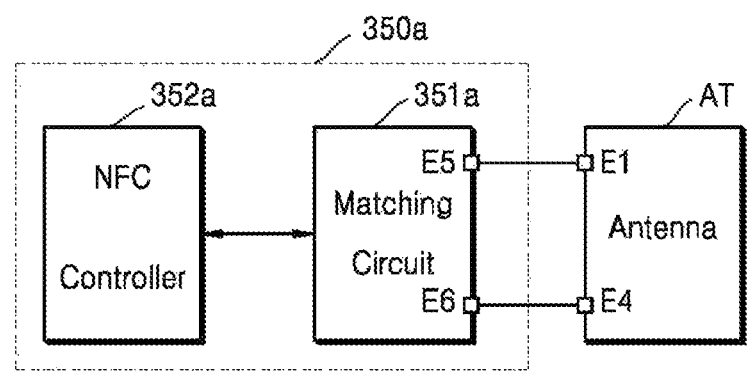
FIGS. 6B to 6D are views of an antenna module connected to various kinds of wireless modules according to some example embodiments of the inventive concepts.
Figure 6C:
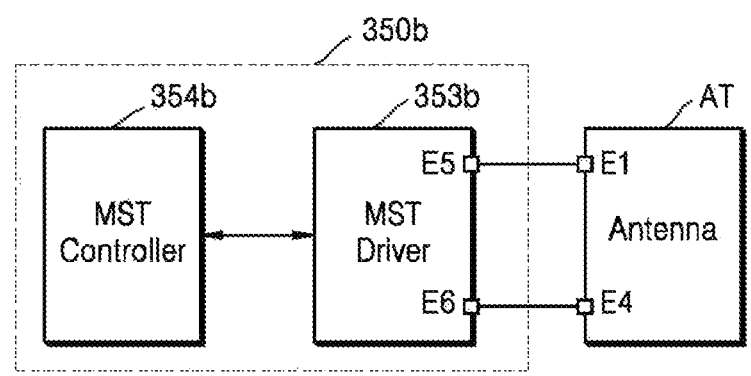
Figure 6D:
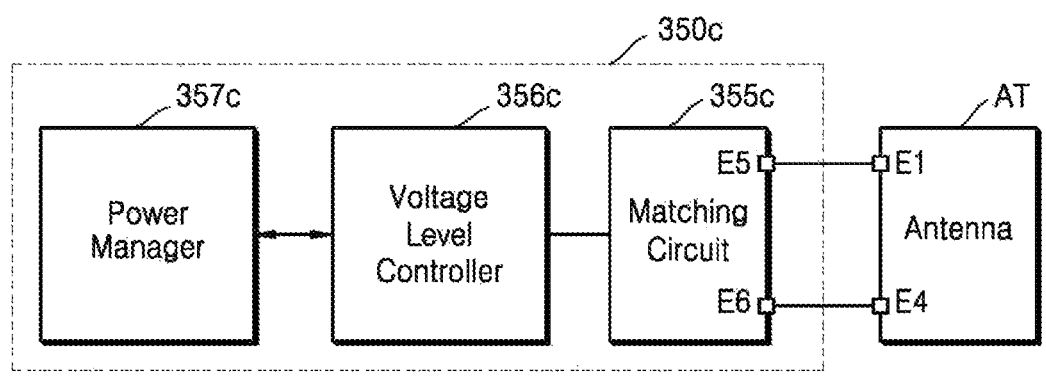

FIG. 6A is a configuration diagram of an electronic device according to an example embodiment of the inventive concepts. FIGS. 6B to 6D are views of an antenna module connected to various kinds of wireless modules according to some example embodiments of the inventive concepts.

Referring to FIG. 6A, an electronic device 300 may include a metal frame 310, an antenna AT, and a wireless module 350. The antenna AT may include a frame antenna segment 312 and a coil antenna segment 330. The frame antenna segment 312 may include at least a partial region and terminals E1 and E2 of the metal frame 310 surrounding the outside of the electronic device 300. The frame antenna segment 312 may be formed of at least one of copper (Cu), aluminum (Al), iron (Fe), titanium (Ti), silver (Ag), palladium (Pd), platinum (Pt), gold (Au), and nickel (Ni), or an alloy of at least two of them. An inner surface and/or upper and lower surfaces of the frame antenna segment 312 may be coated with a ferrite or a magneto dielectric material (MDM) to mitigate or prevent interference with peripheral RF communication and to improve performance. The coil antenna segment 330 may include a desired (or alternatively prescribed) conductive coil 332 and terminals E3 and E4. Because some example embodiments of the frame antenna segment 312 and the coil antenna segment 330 are described above, a detailed description thereof will not be given here.

The terminal E1 of the frame antenna segment 312 may be electrically connected to the wireless module 350, and the terminal E2 of the frame antenna segment 312 may be electrically connected to the terminal E3 of the coil antenna segment 330. The terminal E4 of the coil antenna segment 330 may be electrically connected to the wireless module 350. The wireless module 350 may perform desired (or alternatively prescribed) wireless communication operations by using the antenna AT.

The electronic device 300 according to the present disclosure, by using the antenna AT including the frame antenna segment 312 corresponding to a part of the metal frame 310 protecting the outside of the electronic device 300 and the coil antenna segment 330 including the conductive coil 332, may provide inductance suitable for the wireless module 350 to perform the desired (or alternatively prescribed) wireless communication operations. Furthermore, the radiation performance or reception performance of the antenna AT may be improved by including the frame antenna segment 312, and thus the wireless module 350 may smoothly perform wireless communication operations.

Referring to FIG. 6B, in an example embodiment, the wireless module 350 of FIG. 6A may be a NFC module 350a, and the NFC module 350a may be electrically connected to the antenna AT according to an example embodiment of the inventive concepts through terminals E5 and E6 and may perform an NFC operation.

The NFC module 350a may include a matching circuit 351a and an NFC controller 352a. The matching circuit 351a may transmit and receive a signal to/from the NFC controller 352a. Furthermore, the matching circuit 351a may include the terminals E5 and E6 and may transmit and receive a signal to/from the antenna AT. The matching circuit 351a may include at least one passive device, for example, a resistor, a capacitor, or an inductor, and may convert impedance between the NFC controller 352a and the antenna AT. The NFC controller 352a may control the NFC operation. For example, the NFC controller 352a may receive data by communicating with a host, and may output a signal generated by modulating the received data to the matching circuit 351a. Furthermore, the NFC controller 352a may transmit data generated by demodulating the signal from the matching circuit 351a to the host. For convenience of description, the NFC module 350a and the antenna AT are separately described, but inventive concepts are not limited thereto and the antenna AT may be included in the NFC module 350a.

According to the inventive concepts, the antenna AT may have inductance suitable for the NFC module 350a to smoothly perform an NFC operation, and improved radiation performance and/or reception performance.

Referring to FIG. 6C, in an example embodiment, the wireless module 350 of FIG. 6A may be an MST module 350b, and the MST module 350b may be electrically connected to the antenna AT according to an example embodiment of the inventive concepts through E5 and E6 terminals and may perform an MST operation.

The MST module 350b may include an MST driver 353b and an MST controller 354b. The MST controller 354b may control security data of a credit card stored in an electronic device to output the security data from the MST driver 353b. The MST controller 354b may control whether to output the security data from the MST driver 353b. Furthermore, the MST driver 353b may include the E5 and E6 terminals and may be electrically connected to the antenna AT. The MST driver 353b may output the security data through the antenna AT.

According to the present disclosure, the antenna AT may have inductance suitable for the MST module 350b to smoothly perform an NFC operation, and improved radiation performance and/or reception performance.

Referring to FIG. 6D, in an example embodiment, the wireless module 350 of FIG. 6A may be a wireless charging module 350c, and the wireless charging module 350c may be electrically connected to the antenna AT according to an example embodiment of the inventive concepts through E5 and E6 terminals and may perform a wireless charging operation. The wireless charging module 350c may include a matching circuit 355c, a voltage level controller 356c, and a power manager 357c.

The antenna AT may receive a power signal inserting a data signal from a wireless power supply, or may transmit the data signal to the wireless power supply. The matching circuit 355c may include a resonance frequency matching device to match resonance frequencies between an electronic device and the wireless power supply, and an impedance matching device to match impedance between the electronic device and the wireless power supply. The voltage level controller 356c may include a frequency detector detecting a frequency of a power signal received from the wireless power supply through the antenna AT, and a voltage level controller 356c may adjust a voltage level of the power signal by using the detected frequency and transmitting the power signal to the power manager 357c. The power manager 357c may charge a battery of the electronic device with the received power signal.

According to the inventive concepts, the antenna AT may have inductance suitable for the wireless charging module 350c to smoothly perform the wireless charging operation, and high radiation performance or reception performance.

Figure 7A:
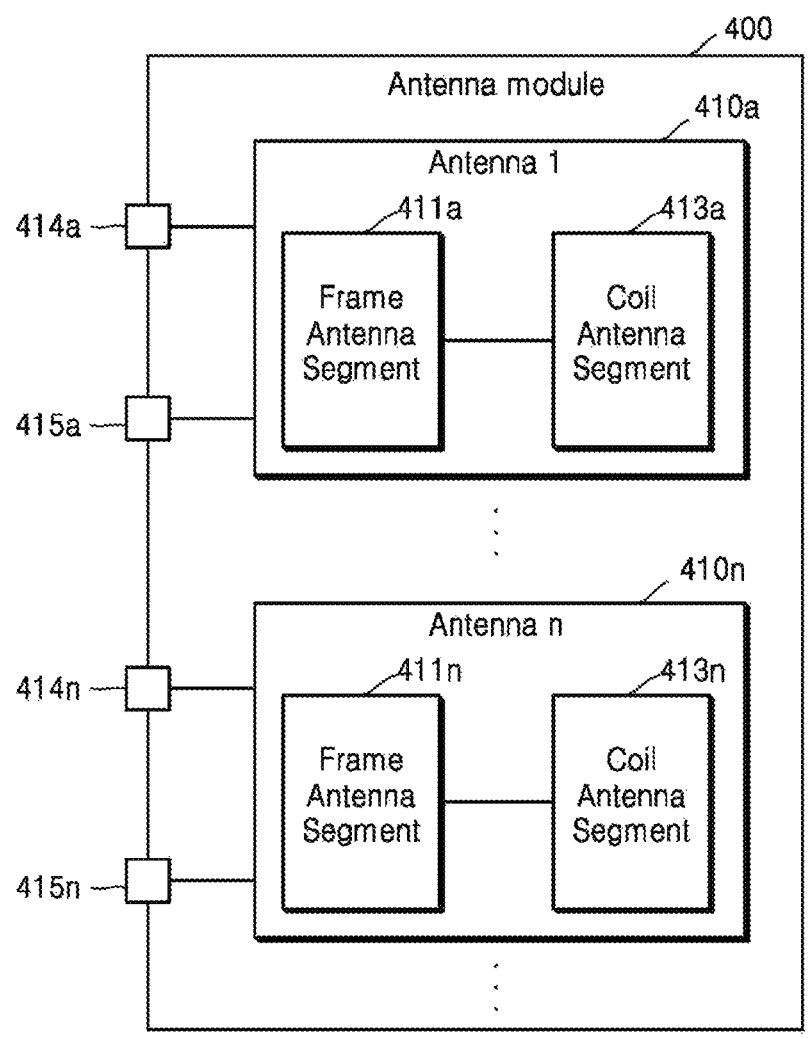
FIG. 7A is a block diagram of an antenna module according to an example embodiment of the inventive concepts.
Figure 7B:
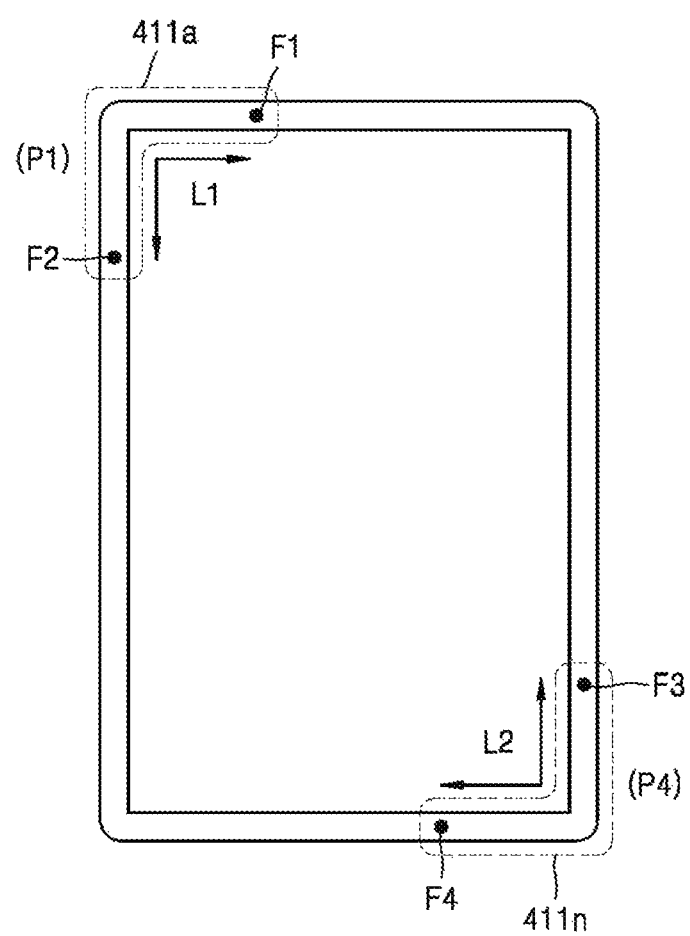
FIG. 7B is a view of a frame antenna segment according to an example embodiment of the inventive concepts.

FIG. 7A is a block diagram of an antenna module 400 according to an example embodiment of the inventive concepts. FIG. 7B is a view of a frame antenna segment according to an example embodiment of the inventive concepts, and FIG. 7C is a view of a coil antenna segment according to an example embodiment of the inventive concepts.

Referring to FIG. 7A, the antenna module 400 may include first to nth antennas 410a to 410n. The first antenna 410a may include a frame antenna segment 411a, a coil antenna segment 413a, and terminals 414a and 415a. The nth antenna 410n may include a frame antenna segment 411n, a coil antenna segment 413n, and terminals 414n and 415n. The antennas 410a to 410n may be connected to wireless modules, respectively. In an example embodiment, a position or positions of at least one of the frame antenna segments 411a to 411n on a metal frame and/or lengths of a partial region of the metal frame included in the frame antenna segments 411a to 411n may be different from others according to the wireless modules. For example, referring to FIG. 7B, the frame antenna segment 411a of the first antenna 410a may be formed in a first position P1 on the metal frame 110, and the frame antenna segment 411n of the nth antenna 410n may be formed in a fourth position P4 on the metal frame 110. Therefore, the first antenna 410a may radiate or receive a signal around the first position P1, and the nth antenna 411n may radiate or receive a signal around the fourth position P4.

Furthermore, a length L1 of a partial region of the metal frame included in the frame antenna segment 411a of the first antenna 410a may be shorter than a length L2 of a partial region of the metal frame included in the frame antenna segment 411n of the nth antenna 410n. According to an example embodiment, a length of each partial region of the metal frame may be defined as a length between a terminal connected to the coil antenna segment and a terminal connected to a wireless module from among terminals included in each frame antenna segment. Therefore, the radiation performance and/or reception performance of the nth antenna 410n may be better than that of the first antenna 410a. However, this is only an example and the inventive concepts are not limited thereto. Positions of frame antenna segments of antennas may be different from each other according to wireless modules connected thereto.

Figure 7C:
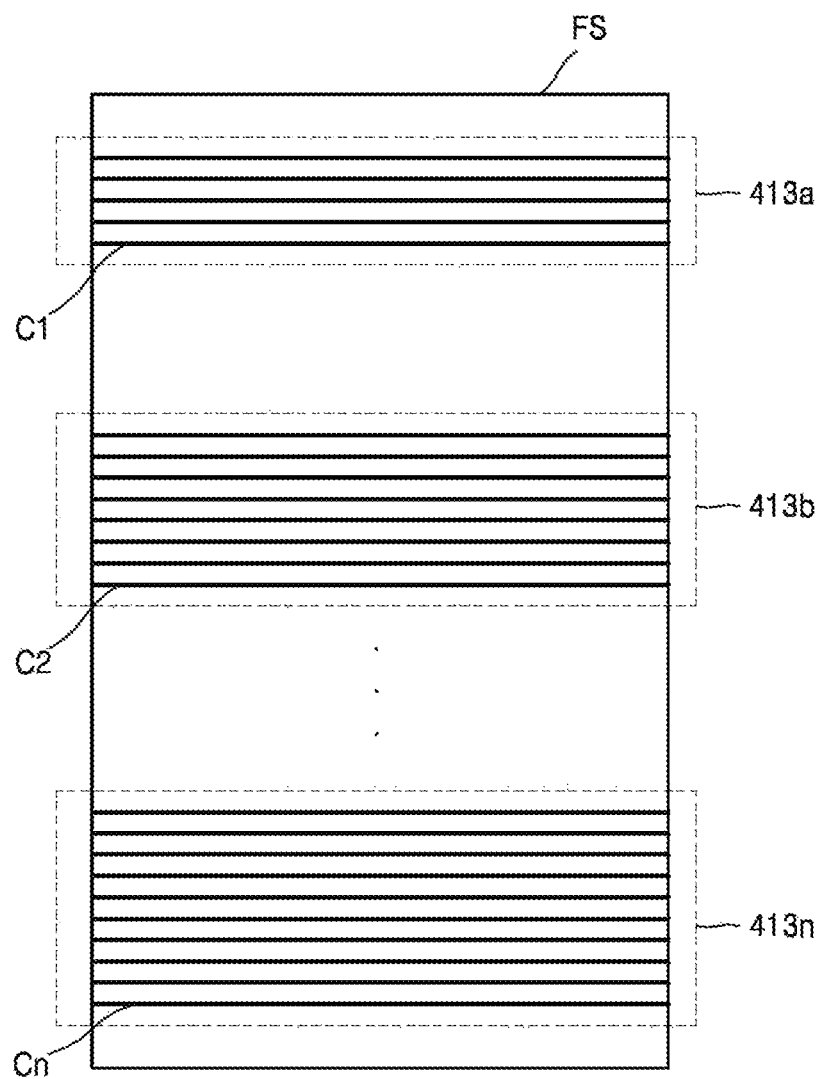
FIG. 7C is a view of a coil antenna segment according to an example embodiment of the inventive concepts.

Referring to FIG. 7C, in an example embodiment, a plurality of coil antenna segments 413a to 413n may be formed in a ferrite sheet FS as a plurality of conductive coils C1 to Cn are helically wound around the ferrite sheet FS. Furthermore, a shielding member to mitigate or prevent interference of each signal may exist between regions around where the conductive coils C1 to Cn are respectively wound. Each inductance of the coil antenna segments 413a to 413n may be different from others according to each wireless module connected to the coil antenna segments 413a to 413n. For example, the conductive coil Cn of the coil antenna segment 413n of the nth antenna 410n may have a larger number of windings and/or closer winding intervals than that of the conductive coil C1 of the coil antenna segment 413a of the first antenna 410a, and thus the inductance of the coil antenna segment 413n of the nth antenna 410n may be greater than that of the coil antenna segment 413a of the first antenna 410a. However, this is only an example and the inventive concepts are not limited thereto. In one example embodiment, the coil antenna segments 413a to 413n may have identical inductances. Furthermore, the forming of the coil antenna segments 413a to 413n in a single ferrite sheet FS is only an example, and the coil antenna segments 413a to 413n may be formed by winding conductive coils around a plurality of ferrite sheet FS, respectively.

Figure 8:
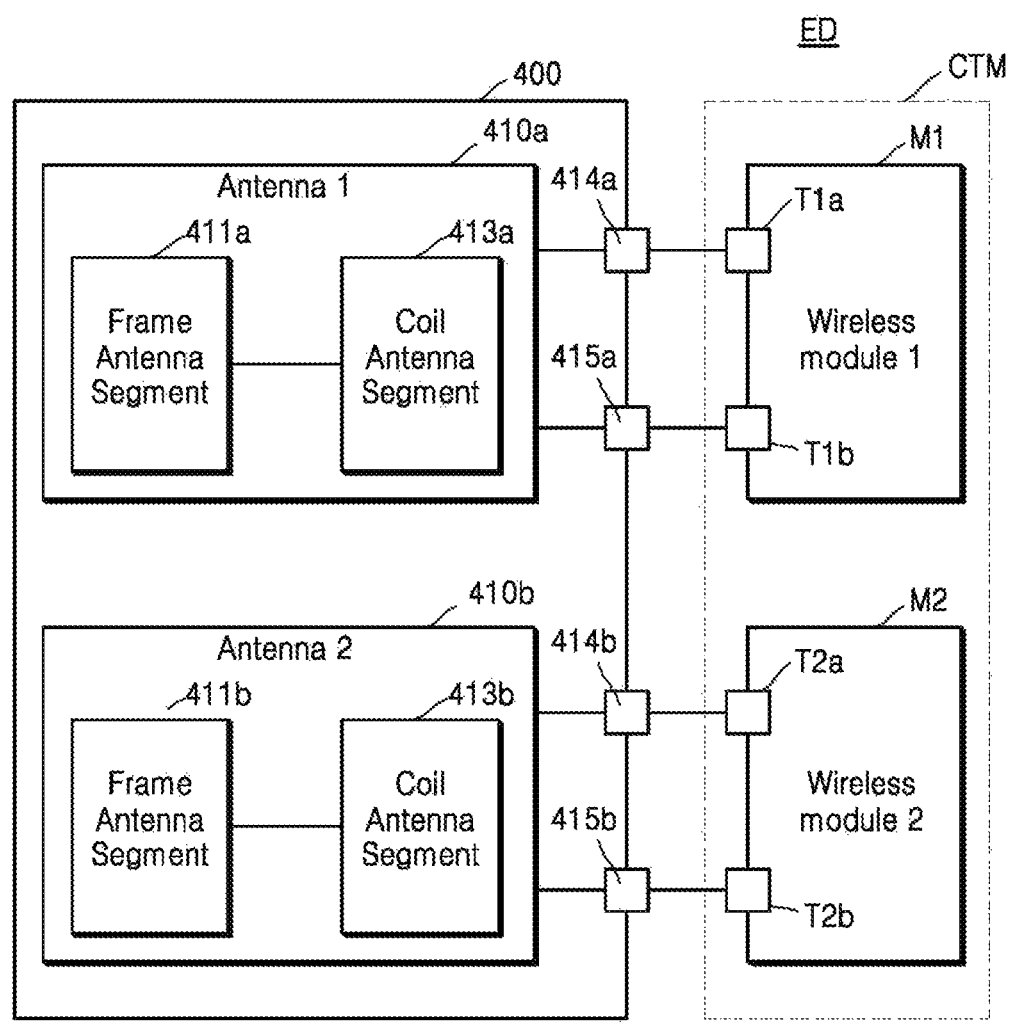
FIG. 8 is a block diagram of an electronic device for describing a connection relationship between an antenna module and a wireless module, according to an example embodiment of the inventive concepts.

FIG. 8 is a block diagram of an electronic device for describing a connection relationship between an antenna module 400 and a wireless module, according to an example embodiment of the inventive concepts.

Referring to FIG. 8, the electronic device ED may include the antenna module 400 and a wireless integrated module CTM connected thereto. The antenna module 400 may include first and second antennas 410a and 410b, and the wireless integrated module CTM may include first and second wireless modules M1 and M2. The first antenna 410a may be connected to a first wireless module M1 through terminals 414a, 415a, T1a, and T1b, and the second antenna 410b may be connected to a second wireless module M2 through terminals 414b, 415b, T2a, and T2b. The first antenna 410a may include a first frame antenna segment 411a and a first coil antenna segment 413a, and the second antenna 410b may include a second frame antenna segment 411b and a second coil antenna segment 413b.

Hereinafter, it will be assumed that the first wireless module M1 is an NFC module and the second wireless module M2 is an MST module. In an example embodiment, the first frame antenna segment 411a of the first antenna 410a may be formed in a first position on a metal frame of the electronic device ED, and the second frame antenna segment 411b of the second antenna 410b may be formed in a second position on a metal frame of the electronic device ED. Furthermore, the inductance of the first coil antenna segment 413a of the first antenna 410a may be less than that of the second coil antenna segment 413b of the second antenna 410b.

As such, a position of a frame antenna segment of an antenna connected to a wireless module and the inductance of a coil antenna segment may vary depending on a type of the wireless module.

Figure 9:
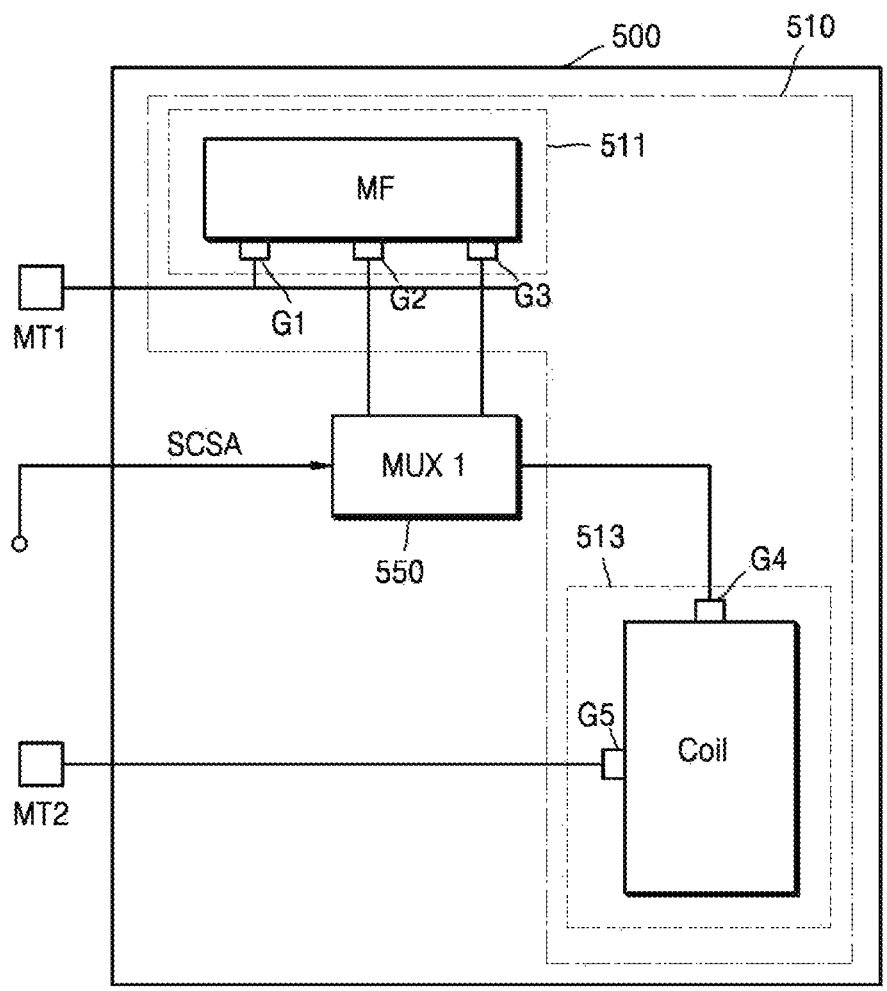
FIG. 9 is a block diagram of an antenna module according to an example embodiment of the inventive concepts.

FIG. 9 is a block diagram of an antenna module 500 according to an example embodiment of the inventive concepts.

Referring to FIG. 9, the antenna module 500 may include an antenna 510 including a frame antenna segment 511, a coil antenna segment 513, and a first multiplexer 550. The frame antenna segment 511 may include a metal frame region MF of an electronic device and a plurality of terminals G1 to G3. The coil antenna segment 513 may include a conductive coil and a plurality of terminals G4 and G5. The first multiplexer 550 may include a plurality of switching devices.

In an example embodiment, the first terminal G1 may be electrically connected to an MT1 terminal of a wireless module, and the second and third terminals G2 and G3 may be selectively electrically connected to the fourth terminal G4 of the coil antenna segment 513 through the first multiplexer 550 based on a selection control signal SCSA. The fifth terminal G5 may be electrically connected to an MT2 terminal of a wireless module. A signal radiation/receiving region of the metal frame region MF when the second terminal G2 is selected and electrically connected to the fourth terminal G4 through the first multiplexer 550 based on the selection control signal SCSA, may be shorter than that of the metal frame region MF when the third terminal G3 is selected and electrically connected to the fourth terminal G4 through the first multiplexer 550. According to an example embodiment of the inventive concepts, a length of the metal frame region MF functioning as an antenna may be controlled by controlling the first multiplexer 550 based on the selection control signal SCSA.

Figure 10:
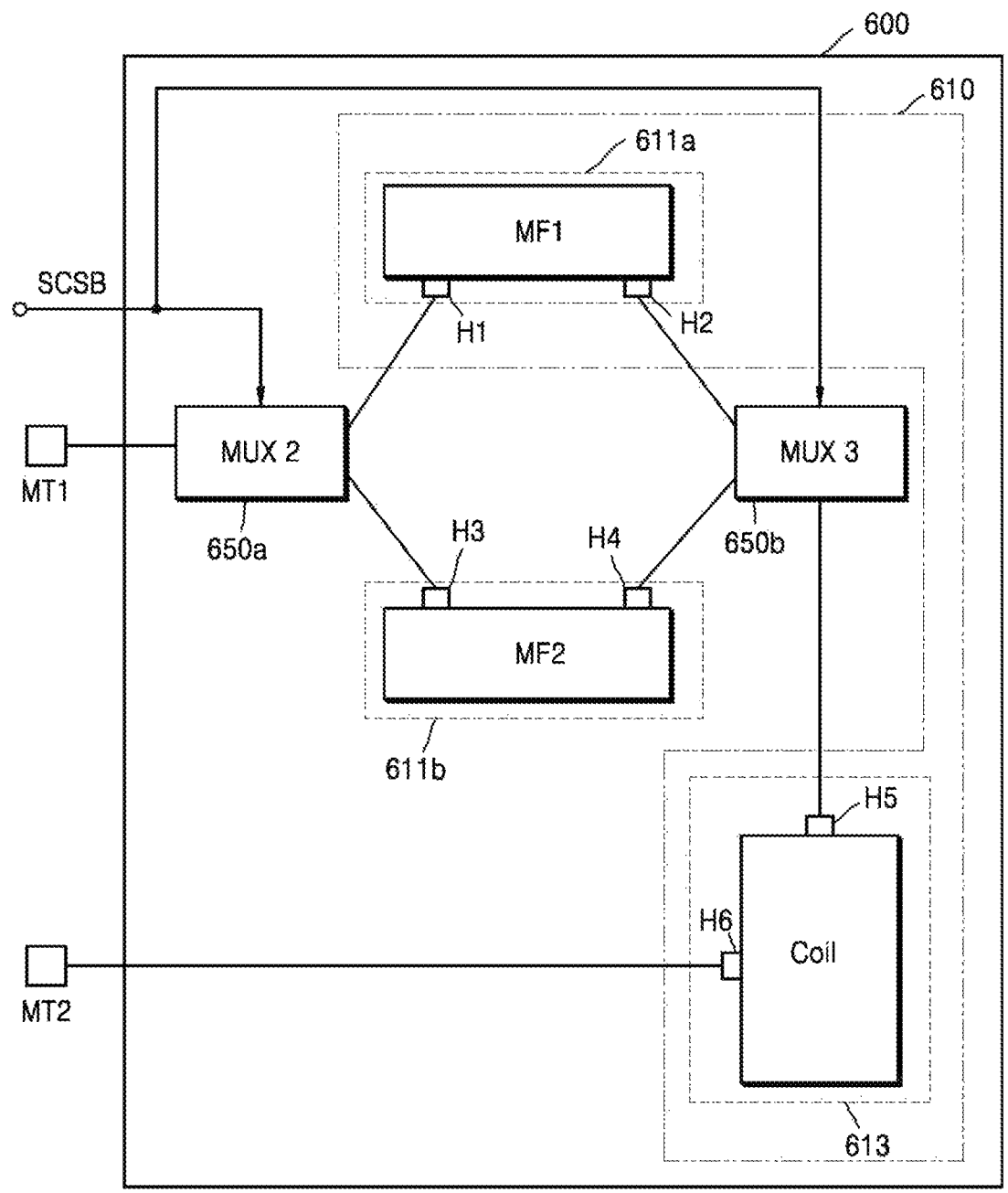
FIG. 10 is a block diagram of an antenna module according to an example embodiment of the inventive concepts.

FIG. 10 is a block diagram of an antenna module 600 according to an example embodiment of the inventive concepts.

Referring to FIG. 10, the antenna module 600 may include a first frame antenna segment 611a, a second frame antenna segment 611b, a coil antenna segment 613, a second multiplexer 650a, and a third multiplexer 650b. The first frame antenna segment 611a may include a first metal frame region MF1 of an electronic device and a plurality of terminals H1 and H2. The second frame antenna segment 611b may include a second metal frame region MF2 of an electronic device and a plurality of terminals H3 and H4. The coil antenna segment 613 may include a conductive coil and a plurality of terminals H5 and H6. The second and third multiplexers 650a and 650b may include a plurality of switching devices.

In an example embodiment, the first frame antenna segment 611a may be the frame antenna segment 411a formed in the first position P1 on the metal frame 110 of FIG. 7B, and the second frame antenna segment 611b may be the frame antenna segment 411n formed in the fourth position P4 on the metal frame 110 of FIG. 7B.

The first and third terminals H1 and H3 may be selectively electrically connected to the MT1 terminal of the wireless module through the second multiplexer 650a based on a selection control signal SCSB. Furthermore, the second and fourth terminals H2 and H4 may be selectively electrically connected to the fifth terminal H5 through the third multiplexer 650b based on the selection control signal SCSB. For example, the first frame antenna segment 611a or the second frame antenna segment 611b may be selected based on the selection control signal SCSB and may be connected to the wireless module or the coil antenna segment 613. For example, when the first frame antenna segment 611a is selected, an antenna 610 including the first frame antenna segment 611a and the coil antenna segment 613 may be connected to the wireless module. When the first frame antenna segment 611a is selected, the antenna 610 may radiate or receive a signal in the first position P1, and may select the second frame antenna segment 611b by controlling the second and third multiplexers 650a and 650b to change a radiation or receiving position of the signal afterwards. According to an example embodiment of the inventive concepts, the radiation or receiving position of the signal may be controlled by selecting one from among frame antenna segments each functioning as an antenna by controlling the second and third multiplexers 650a and 650b based on the selection control signal SCSB.

Figure 11:
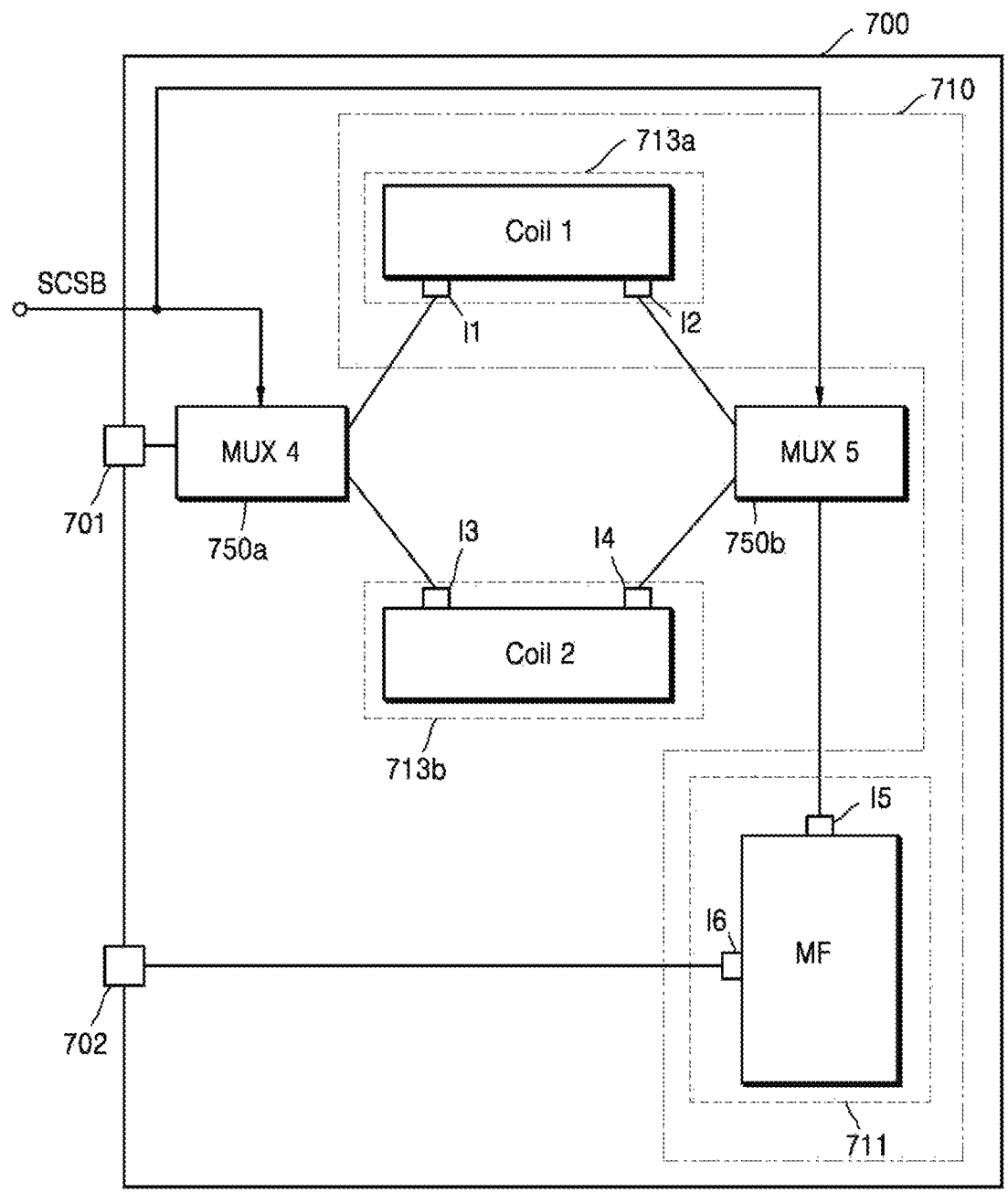
FIG. 11 is a block diagram of an antenna module according to an example embodiment of the inventive concepts.

FIG. 11 is a block diagram of an antenna module 700 according to an example embodiment of the inventive concepts.

Referring to FIG. 11, the antenna module 700 may include a first coil antenna segment 713a, a second coil antenna segment 713b, a frame antenna segment 711, a fourth multiplexer 750a, and a fifth multiplexer 750b. The first coil antenna segment 713a may include a first conductive coil Coil 1 and a plurality of terminals I1 and I2. The second coil antenna segment 713b may include a second conductive coil Coil 2 and a plurality of terminals I3 and I4. The frame antenna segment 711 may include a metal frame region MF of an electronic device and a plurality of terminals I5 and I6. The fourth and fifth multiplexers 750a and 750b may include a plurality of switching devices.

In an example embodiment, the first conductive coil Coil 1 of the first coil antenna segment 713a may be the first conductive coil C1 of FIG. 7C, and the second conductive coil Coil 2 of the second coil antenna segment 713b may be the second conductive coil C2 of FIG. 7C.

The first and third terminals I1 and I3 may be selectively electrically connected to a terminal 701 of the wireless module through the fourth multiplexer 750a based on a selection control signal SCSC. Furthermore, the second and fourth terminals I2 and I4 may be selectively connected to the fifth terminal I5 through the fifth multiplexer 750b based on the selection control signal SCSC. For example, the first coil antenna segment 713a or the second coil antenna segment 713b may be selected based on the selection control signal SCSC and may be connected to the wireless module or the frame antenna segment 711. For example, when the first coil antenna segment 713a is selected, an antenna 710 including the first coil antenna segment 713a and the frame antenna segment 711 may be connected to the wireless module. According to an example embodiment of the inventive concepts, the inductance of the antenna 710 may be controlled by selecting a coil antenna segment functioning as an antenna by controlling the fourth and fifth multiplexers 750a and 750b based on the selection control signal SCSC.

As such, when the antenna 710 is connected to an NFC module, the first coil antenna segment 713a may be selected by the selection control signal SCSC and may function as an antenna. Furthermore, when the antenna 710 is connected to an MST module requiring an antenna having greater inductance than that of the NFC module, the second coil antenna segment 713b may be selected by the selection control signal SCSC and may function as an antenna.

Figure 12:
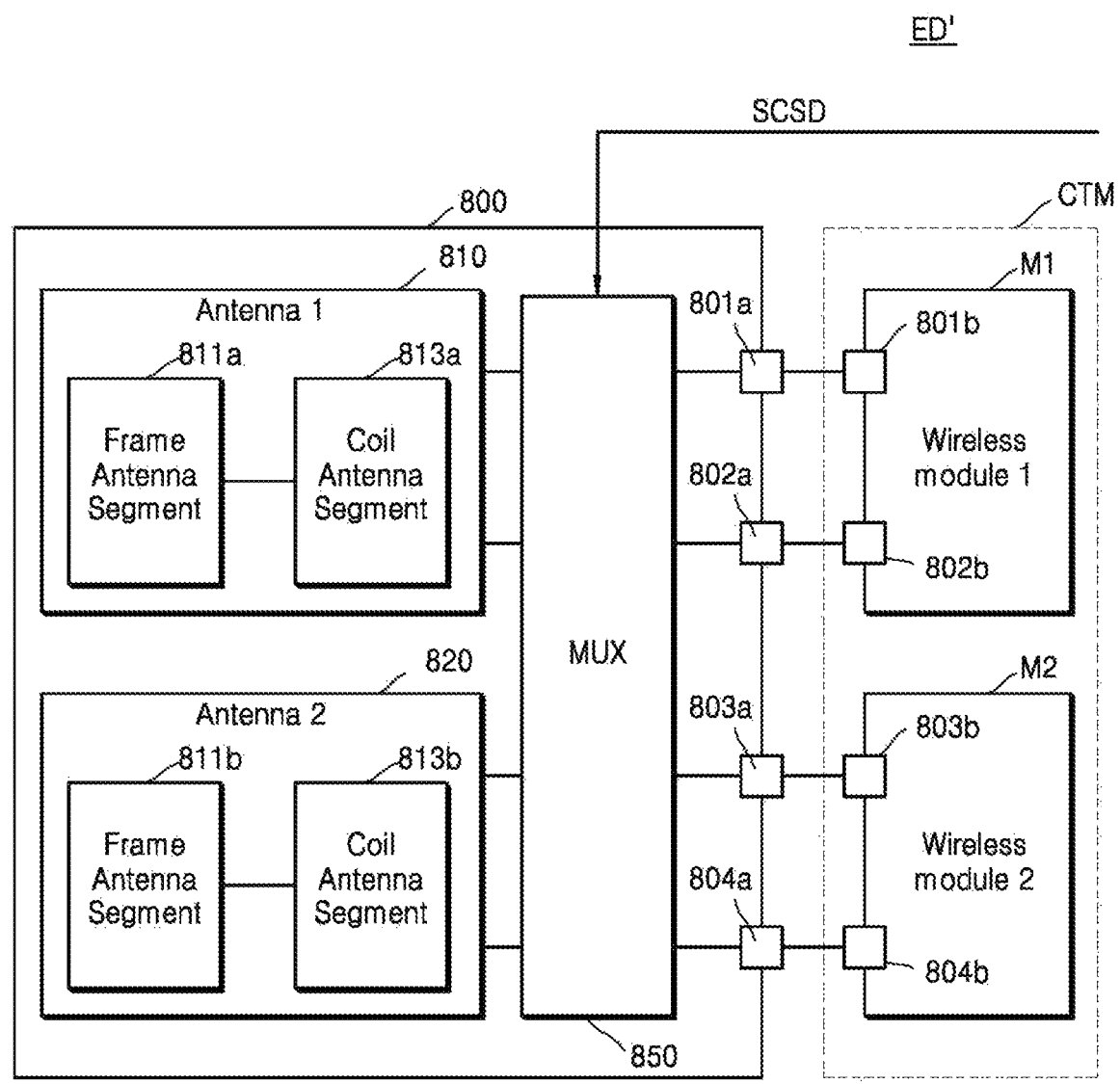
FIG. 12 is a block diagram of an electronic device according to an example embodiment of the inventive concepts.

FIG. 12 is a block diagram of an electronic device ED' according to an example embodiment of the inventive concepts.

Referring to FIG. 12, the electronic device ED' may further include a multiplexer 850 selected and controlled by a selection control signal SCSD. In an example embodiment, a first wireless module M1 may be connected to any one of first and second antennas 810 and 820 based on a selection control signal SCSD. Furthermore, the second wireless module M2 may be connected to any one of the first and second antennas 810 and 820 based on the selection control signal SCSD.

Figure 13:
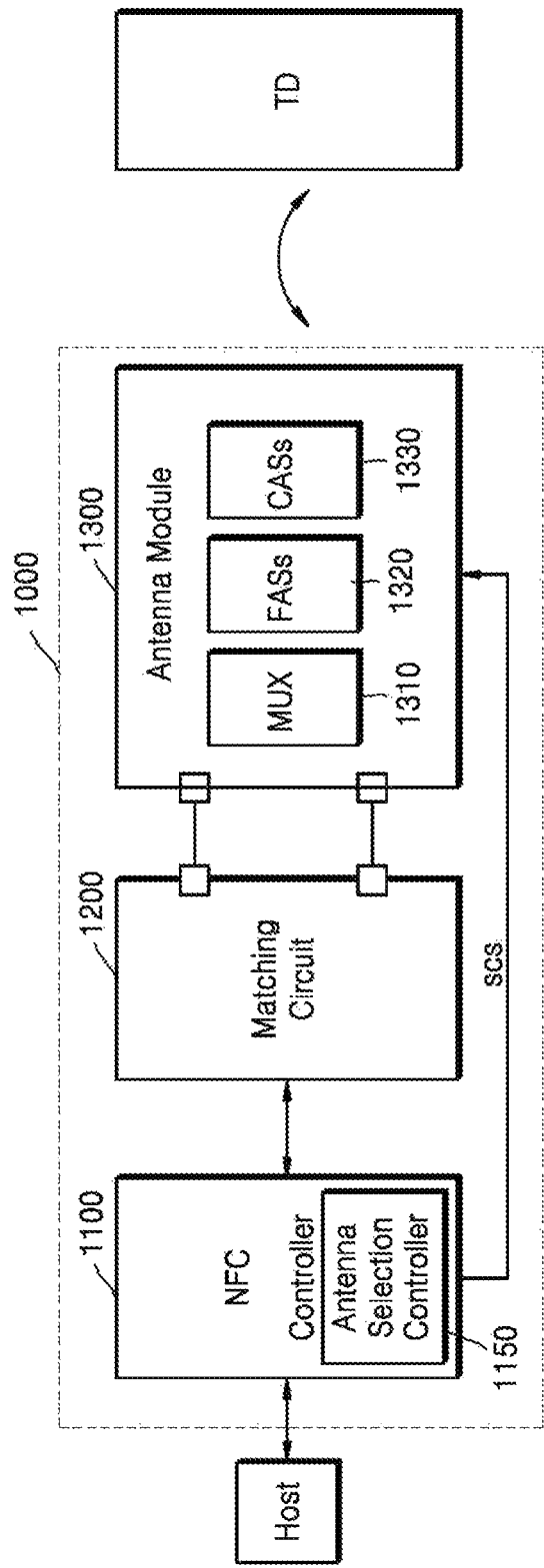
FIG. 13 is a block diagram of an electronic device for describing a selection control signal according to an example embodiment of the inventive concepts.

FIG. 13 is a block diagram of an electronic device 1000 for describing a selection control signal according to an example embodiment of the inventive concepts.

Referring to FIG. 13, according to an example embodiment of the inventive concepts, the electronic device 1000 may include an NFC controller 1100, a matching circuit 1200, and an antenna module 1300. The electronic device 1000 may wirelessly transmit and receive data to/from another telecommunication device TD, and may communicate with a host. The antenna module 1300 may include a multiplexer 1310, a plurality of frame antenna segments 1320, and a plurality of coil antenna segments 1330. The NFC controller 1100 may further include an antenna selection controller 1150, and the antenna selection controller 1150 may provide a selection control signal SCS to the antenna module 1300 and may select at least one of the frame antenna segments 1320 or at least one of the coil antenna segments 1330. In an example embodiment, the antenna selection controller 1150, based on information about inductance suitable for NFC, may generate the selection control signal SCS to select a coil antenna segment corresponding to the inductance. The antenna selection controller 1150 may receive information about a radiation or receiving position of a signal desired by a user from the host, and may generate the selection control signal SCS to select a frame antenna segment capable of radiating or receiving a signal in a position corresponding to the position information based on the position information. In another example embodiment, the antenna selection controller 1150, may generate the selection control signal SCS to select a frame antenna segment having a larger radiation/receiving region when current communication sensitivity of the electronic device 1000 is equal to or less than a set value.

Figure 14:
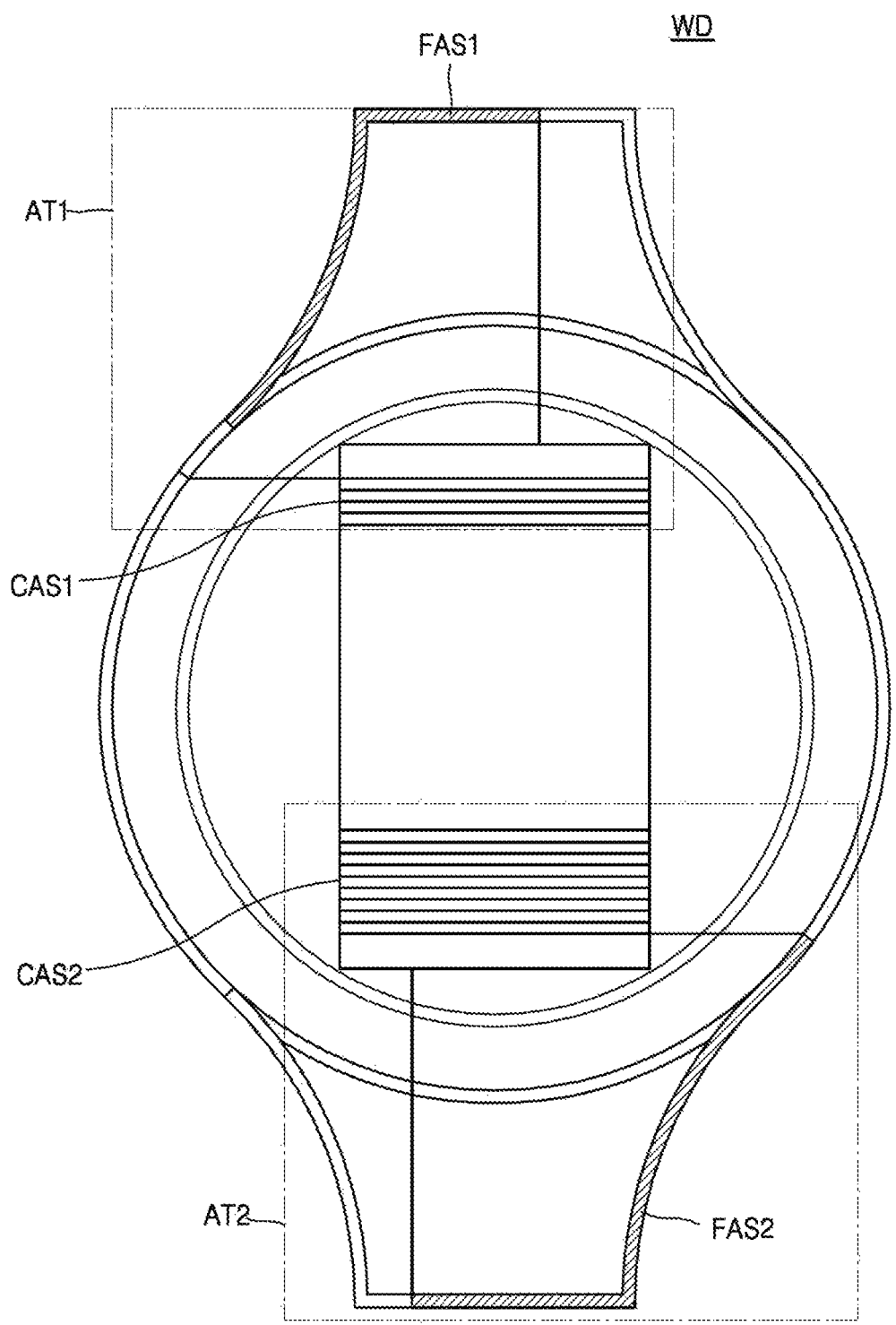
FIG. 14 shows a wearable device employing an antenna module, according to an example embodiment of the inventive concepts.

FIG. 14 shows a wearable device WD employing an antenna module, according to an example embodiment of the inventive concepts.

Referring to FIG. 14, according to an example embodiment of the inventive concepts, the wearable device WD may include a first antenna AT1 and a second antenna AT2. The first antenna AT1 may include a first frame antenna segment FAS1 and a first coil antenna segment CAS1. The second antenna AT2 may include a second frame antenna segment FAS2 and a second coil antenna segment CAS2. According to an example embodiment, because positions of the first and second frame antenna segments FAS1 and FAS2 formed on a metal frame of the wearable device WD are different from each other, accordingly, signal radiation/receiving positions of the first and second frame antenna segments FAS1 and FAS2 may be different from each other. Furthermore, because the number of windings of a conductive coil of the first coil antenna segment CAS1 is different from that of the second coil antenna segment CAS2. Accordingly, inductances of the first and second coil antenna segments CAS1 and CAS2 may be different from each other. For example, because the number of windings of a conductive coil of the second coil antenna segment CAS2 is greater than that of the first coil antenna segment CAS1, the inductance of the second coil antenna segment CAS2 may be greater than that of the first coil antenna segment CAS1.

Figure 15A:
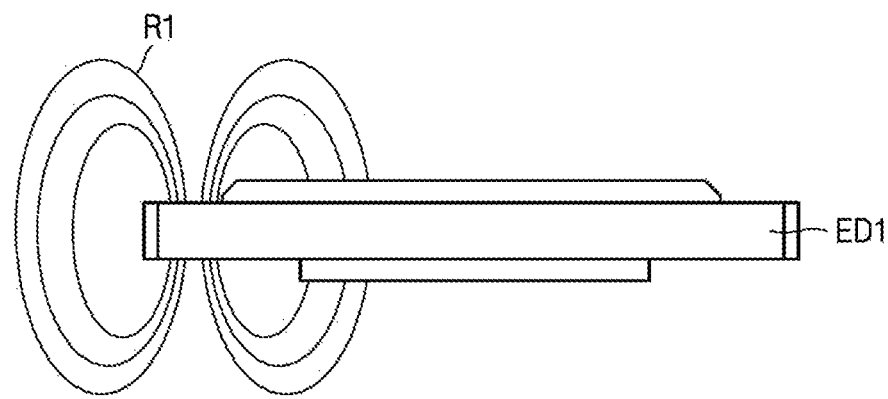
FIGS. 15A and 15B are views illustrating signal radiation performances of antennas, according to a comparative example and an example embodiment of the inventive concepts, respectively.
Figure 15B:
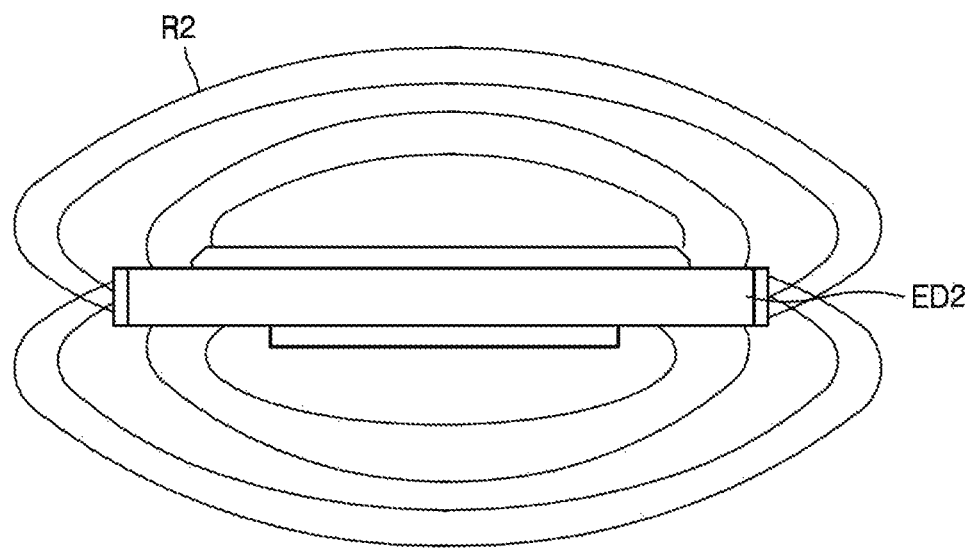

FIGS. 15A and 15B are views illustrating signal radiation performances of antennas, according to a comparative example and an example embodiment of the inventive concepts, respectively.

Referring to FIGS. 15A and 15B, FIG. 15A illustrates a signal radiation R1 of an electronic device ED1 using an antenna including a conductive coil only. FIG. 14B illustrates a signal radiation R2 of an electronic device ED2 using an antenna including both a frame antenna segment and a coil antenna segment, according to an example embodiment of the inventive concepts. Because the signal radiation R2 of the electronic device ED2 using an antenna according to an example embodiment of the inventive concepts is wider than the signal radiation R1 of the electronic device ED1 using an antenna including a conductive coil only, signal radiation performance of the signal radiation R2 of the electronic device ED2 may be better than that of the signal radiation R1 of the electronic device ED1.

Figure 16:
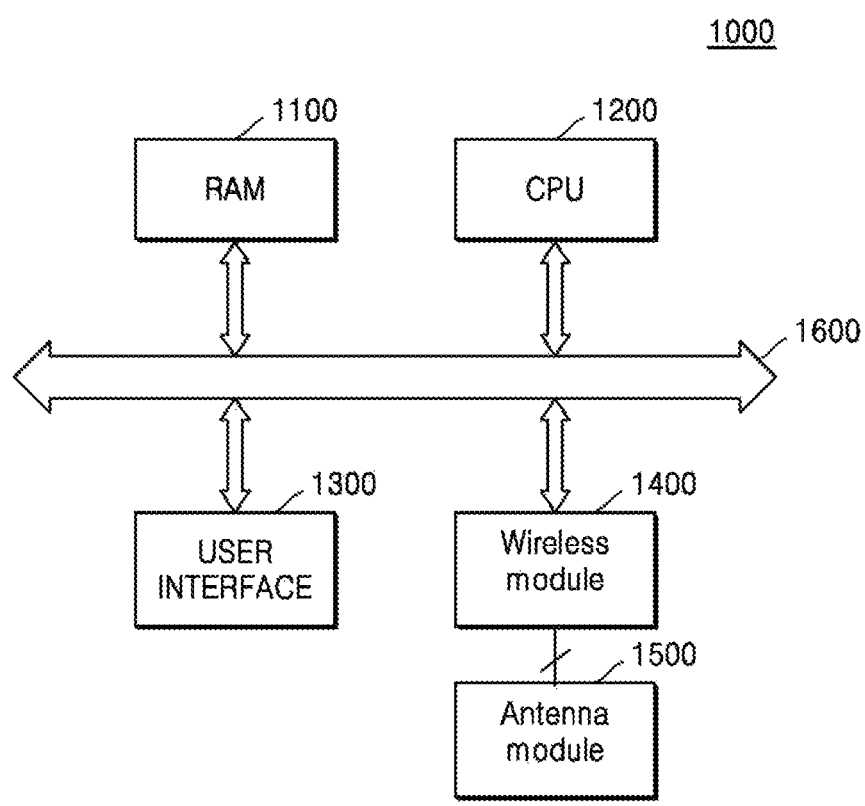
FIG. 16 is a block diagram of a computing system including an antenna module, according to an example embodiment of the inventive concepts.

FIG. 16 is a block diagram of a computing system 1000 including an antenna module 1500, according to an example embodiment of the inventive concepts.

Referring to FIG. 16, the computing system 1000 such as a mobile device, a desktop computer, or a server may include the antenna module 1500 according to one of example embodiments of the inventive concepts. According to an example embodiment of the inventive concepts, the computing system 1000 may include a random access memory (RAM) 1100, a central processing unit (CPU) 1200, a user interface 1300, a wireless module 1400, and an antenna module 1500, and the components may be electrically connected to a bus 1600.

The CPU 1200 may control the computing system 1000, and may transmit data, which is to be transmitted to outside the computing system 1000 through the wireless module 1400, to the wireless module 1400 through the bus 1600. The RAM 1100 may function as a data memory of the CPU 1200 and may include, for example, a dynamic random access memory (DRAM). The user interface 1300 may receive a command from a user of the computing system 1000 or may output a signal (for example, voice or image data) to the user. According to the example embodiments described above, the antenna module 1500 may include an antenna including a frame antenna segment and a coil antenna segment, and the wireless module 1400 may perform improved wireless communication operation by using the antenna included in the antenna module 1500.

While the inventive concepts have been particularly shown and described with reference to some example embodiments thereof, it will be understood that various changes in form and details may be made therein without departing from the spirit and scope of the following claims.

What is claimed is:

1. An antenna module comprising:
 a first antenna configured to transmit and receive a plurality of signals, the first antenna including,
  a first frame antenna segment including at least a first part of a metal frame, the metal frame surrounding a body housing of an electronic device, and
  a first coil antenna segment connected to the first frame antenna segment, the first coil antenna segment including a first conductive coil; and
 a second antenna configured to transmit and receive the plurality of signals, the second antenna including,
  a second frame antenna segment including at least a second part of the metal frame, and
  a second coil antenna segment connected to the second frame antenna segment, the second coil antenna segment including a second conductive coil,
 a first multiplexer including a plurality of first switching devices; and
 a second multiplexer including a plurality of second switching devices,
 wherein the first and second coil antenna segments each include a first set of a first terminal and a second terminal,
 the first terminal of each of the first and second coil antenna segments selectively connected to a wireless module through the first multiplexer, and
 the second terminal of the first and second coil antenna segments selectively connected to the first frame antenna segment through the second multiplexer.

2. The antenna module of claim 1, wherein an inductance of the first coil antenna segment is greater than an inductance of the first frame antenna segment.

3. The antenna module of claim 1, further comprising:
 a ferrite sheet,
 wherein the first conductive coil is helically wound around a first region of the ferrite sheet for a first number of turns, and
 the second conductive coil is helically wound around a second region of the ferrite sheet for a second number of turns.

4. The antenna module of claim 1, wherein
 the first antenna is connected to a first wireless module, the first wireless module configured to perform an operation based on the signals, and
 the second antenna is connected to a second wireless module, the second wireless module configured to perform an operation based on the signals.

5. The antenna module of claim 4, wherein
 an inductance of the first conductive coil is less than an inductance of the second conductive coil,
 the first wireless module is a near field communication (NFC) module, which is configured to perform an NFC operation, and
 the second wireless module is one of a magnetic secure transmission (MST) module or a wireless charging module, the magnetic secure transmission (MST) module configured to perform an MST operation, the wireless charging module configured to perform a wireless charging operation.

6. The antenna module of claim 1, wherein
 a position of the first frame antenna segment is different from a position of the second frame antenna segment on the metal frame.

7. The antenna module of claim 1, wherein
 an inductance of the first conductive coil is different from an inductance of the second conductive coil.

8. The antenna module of claim 1, further comprising:
 wherein the first and second frame antenna segments each include a second set of a third terminal and a fourth terminal,
 the first terminal of each of first and second frame antenna segments selectively connected to the wireless module through the first multiplexer based on a selection control signal, and
 the second terminal of each of first and second frame antenna segments selectively connected to at least one of the first coil antenna segment or the second coil antenna segment through the second multiplexer based on the selection control signal.

9. The antenna module of claim 1, wherein
 any one of the first and second coil antenna segments is selectively connected to any one of the first and second frame antenna segment based on a type of the connected wireless module.

10. An electronic device comprising:
an antenna module including at least one antenna to transmit and receive a plurality of signals to and from an external device; and
at least one wireless module connected to the antenna, the antenna including,
a first frame antenna segment including at least a part of a metal frame, the metal frame surrounding a body housing of the electronic device, and
a first coil antenna segment connected to the first frame antenna segment, the first coil antenna segment including a first conductive coil,
wherein the antenna module further includes a second coil antenna segment, a first multiplexer including a plurality of first switching devices, and a second multiplexer including a plurality of second switching devices, the second coil antenna segment including a second conductive coil, the second conductive coil having an inductance different from an inductance of the first conductive coil, and
the first and second coil antenna segments each include a first set of a first terminal and a second terminal, the first terminal of each of the first and second coil antenna segments selectively connected to the wireless module through the first switching devices of the first multiplexer, and the second terminal of each of the first and second coil antenna segments selectively connected to the first frame antenna segment through the second switching devices of the second multiplexer.

11. The electronic device of claim 10, wherein
at least one of a radiation/receiving position or an inductance of the antenna is changed based on a control signal received from the wireless module.

12. The electronic device of claim 10, wherein
the antenna module further includes a second frame antenna segment,
the first frame antenna segment is at a first position on the metal frame,
the second frame antenna segment is at a second position on the metal frame, and
the first and second frame antenna segments each includes a second set of a third terminal and a fourth terminal, the third terminal of each of the first and second frame antenna segments selectively connected to the wireless module through the switching devices of the first multiplexer, and the fourth terminal of each of the first and second frame antenna segments selectively connected to the first coil antenna segment through the switching devices of the second multiplexer.

13. The electronic device of claim 10, wherein
any one of the first and second coil antenna segments is selectively connected to the first frame antenna segment based on a type of the wireless module.

14. The electronic device of claim 13, wherein
the inductance of the first conductive coil is less than the inductance of the second conductive coil,
when the wireless module is a near field communication (NFC) module, the second multiplexer is configured to connect the first frame antenna segment to the first coil antenna segment, and
when the wireless module is a magnetic secure transmission (MST) module, the second multiplexer is configured to connect the first frame antenna segment to the second coil antenna segment.

15. An electronic device comprising:
a body housing;
a frame surrounding at least a portion of the body housing, the frame being a metal frame or an insulator frame;
an antenna module configured to transmit and receive signals to and from an external device, the antenna module including at least one frame antenna segment and at least one coil antenna segment,
the at least one frame antenna segment including,
a partial region of the metal frame when the frame is the metal frame, or
a metal pattern helically coated around the insulator frame when the frame is the insulator frame;
the at least one coil antenna segment connected to the at least one frame antenna segment, the at least one coil antenna segment including a helically wound conductive coil; and
a wireless module connected to the antenna module,
wherein the antenna module further includes a first multiplexer and a second multiplexer,
the at least one coil antenna segment includes a first coil antenna segment and a second coil antenna segment, the first coil antenna segment including a first conductive coil, the second coil antenna segment including a second conductive coil, the second conductive coil having an inductance different from an inductance of the first conductive coil, and
the first and second coil antenna segments each include a set of a first terminal and a second terminal, the first terminal of each of the first and second coil antenna segments selectively connected to the wireless module through the first multiplexer based on a first selection control signal, and the second terminal of each of the first and second coil antenna segments selectively connected to the at least one frame antenna segment through the second multiplexer based on the selection control signal.

16. The electronic device of claim 15, wherein
the at least one frame antenna segment includes a plurality of frame antenna segments, the plurality of frame antenna segments provided at different regions of the metal frame, respectively,
a third terminal of each of the plurality of frame antenna segments is electrically connected to the at least one coil antenna segment, and
a fourth terminal of each of the plurality of frame antenna segments is electrically connected to the wireless module.

17. The electronic device of claim 15, wherein
the first multiplexer and the second multiplexer are between the at least one frame antenna segment and the at least one coil antenna segment,
the at least one frame antenna segment includes a metal frame region and a set of third terminals,
one of the third terminals of the at least one frame antenna segment is electrically connected to the wireless module, and
another of the third terminals are selectively electrically connected to the set of second terminals of the at least one coil antenna segment through the second multiplexer based on the selection control signal to adjust an effective length of the metal frame region functioning an antenna.

18. The electronic device of claim 15, wherein
the at least one frame antenna segment includes a first frame antenna segment and a second frame antenna segment, and
the first and second frame antenna segments each include a set of a third terminal and a fourth terminal, the third terminal of each of the first and second frame antenna segments selectively connected to the wireless module through the first multiplexer based on the selection control signal, and the fourth terminal of each of the first and second frame antenna segments selectively connected to the at least one coil antenna segment through the second multiplexer based on the selection control signal.

* * * * *